United States Patent
Zhang et al.

(10) Patent No.: US 10,560,907 B2
(45) Date of Patent: *Feb. 11, 2020

(54) METHOD FOR DETERMINING TRANSMIT POWER IN COVERAGE ENHANCEMENT SCENARIO AND DEVICE

(71) Applicant: Huawei Technologies Co., Ltd., Shenzhen, Guangdong (CN)

(72) Inventors: Xiangdong Zhang, Beijing (CN); Jinhuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,587

(22) Filed: Nov. 3, 2017

(65) Prior Publication Data
US 2018/0063800 A1     Mar. 1, 2018

Related U.S. Application Data

(63) Continuation of application No. 15/221,447, filed on Jul. 27, 2016, now Pat. No. 9,844,010, which is a (Continued)

(51) Int. Cl.
*H04W 52/50* (2009.01)
*H04W 16/00* (2009.01)
(Continued)

(52) U.S. Cl.
CPC ............. *H04W 52/50* (2013.01); *H04L 1/08* (2013.01); *H04W 4/70* (2018.02); *H04W 16/00* (2013.01);
(Continued)

(58) Field of Classification Search
CPC ... H04W 16/00; H04W 52/50; H04W 72/048; H04L 1/08
(Continued)

(56) References Cited

U.S. PATENT DOCUMENTS 5,815,508 A * 9/1998 Wadzinske ............ H04L 1/1877
714/704
2007/0206531 A1 9/2007 Pajkoski et al.
(Continued)

FOREIGN PATENT DOCUMENTS

CN     103179654 A     6/2013
CN     104541554 A     4/2015
(Continued)

OTHER PUBLICATIONS

Media Tek Inc., "Discussion on PRACH and RACH procedure in coverage enhancement mode," R1-135424, 3GPP TSG-RAN WG1 #75, San Francisco, USA, Nov. 11-15, 2013, 5 pages.
(Continued)

*Primary Examiner* — John J Lee
(74) *Attorney, Agent, or Firm* — Conley Rose, P.C.

(57) ABSTRACT

A method for determining a transmit power in a coverage enhancement scenario and a device resolve a problem that the prior art lacks a solution to determining a transmit power of a preamble sequence in a random access process in the coverage enhancement scenario. The method includes: obtaining, by a terminal, configuration information that is used to determine a transmit power used for transmitting a signal at each coverage enhancement level; and determining, by the terminal according to the obtained configuration information, a transmit power used for transmitting the signal at a coverage enhancement level currently used by the terminal, so as to determine the transmit power used for transmitting the signal in the coverage enhancement scenario.

24 Claims, 3 Drawing Sheets

A network side configures configuration information that is used to determine a transmit power used for transmitting a signal at each coverage enhancement level — 71

The network side transmits the configuration information to a terminal served by the network side, so that the terminal determines, according to the configuration information, a transmit power used for transmitting the signal at a coverage enhancement level currently used by the terminal — 72

Related U.S. Application Data continuation of application No. PCT/CN2014/071713, filed on Jan. 28, 2014.

(51) Int. Cl.

| | |
|---|---|
| *H04W 72/04* | (2009.01) |
| *H04W 4/70* | (2018.01) |
| *H04L 1/08* | (2006.01) |
| *H04W 52/22* | (2009.01) |
| *H04W 52/24* | (2009.01) |
| *H04W 52/28* | (2009.01) |
| *H04W 52/36* | (2009.01) |
| *H04W 52/14* | (2009.01) |

(52) U.S. Cl.
CPC ....... *H04W 52/226* (2013.01); *H04W 52/242* (2013.01); *H04W 52/283* (2013.01); *H04W 52/36* (2013.01); *H04W 72/048* (2013.01); *H04W 52/146* (2013.01)

(58) Field of Classification Search
USPC .............. 455/522, 69, 68, 67.11, 509, 452.1, 455/422.1, 446, 456.1, 456.3
See application file for complete search history.

(56) References Cited

U.S. PATENT DOCUMENTS

| | | | |
|---|---|---|---|
| 2010/0208675 A1 | 8/2010 | Song et al. | |
| 2012/0028630 A1 | 2/2012 | Yamamoto et al. | |
| 2013/0035084 A1 | 2/2013 | Song et al. | |
| 2013/0114401 A1 | 5/2013 | Martin et al. | |
| 2013/0130670 A1 | 5/2013 | Samdanis et al. | |
| 2015/0105059 A1* | 4/2015 | Lamberton | H04L 63/102 455/418 |
| 2015/0181440 A1 | 6/2015 | Chen et al. | |
| 2015/0296518 A1* | 10/2015 | Yi | H04L 1/08 370/336 |
| 2016/0192376 A1 | 6/2016 | Lee et al. | |
| 2016/0234787 A1 | 8/2016 | Liu | |
| 2018/0184306 A1* | 6/2018 | Xiong | H04W 76/14 |

FOREIGN PATENT DOCUMENTS

| | | |
|---|---|---|
| EP | 3021621 A1 | 5/2016 |
| JP | 201234074 A | 2/2012 |
| KR | 20090030781 A | 3/2009 |
| KR | 20120087971 A | 8/2012 |
| WO | 2013056741 A1 | 4/2013 |
| WO | 2013098594 A1 | 7/2013 |

OTHER PUBLICATIONS

Qualcomm Incorporated, "RACH Channel Design for MTC Coverage Enhancements," R1-135296, 3GPP TSG-RAN WG1 #75, San Francisco, USA, Nov. 11-15, 2013, 3 pages.

"Discussion on PRACH Coverage Enhancement for Low Cost MTC", Intel Corporation, 3GPP TSG RAN WG1 Meeting #74, Aug. 19-23, 2013, 7 pages, R1-132930.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.0.0 (Dec. 2013), 57 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0 (Dec. 2013), 349 pages.

3rd Generation Partnership Project; Technical Specification Group Radio Access Network; Evolved Universal Terrestrial Radio Access (E-UTRA); Physical layer procedures (Release 12), 3GPP TS 36.213 V12.0.0 (Dec. 2013), 186 pages.

Foreign Communication From a Counterpart Application, Korean Application No. 2019-030821415, Korean Notice of Allowance dated Apr. 30, 2019, 2 pages.

\* cited by examiner

METHOD FOR DETERMINING TRANSMIT POWER IN COVERAGE ENHANCEMENT SCENARIO AND DEVICE

CROSS-REFERENCE TO RELATED APPLICATIONS

This application is a continuation of U.S. patent application Ser. No. 15/221,447, filed on Jul. 27, 2016, which is a continuation of International Application No. PCT/CN2014/071713, filed on Jan. 28, 2014. All of the aforementioned patent applications are hereby incorporated by reference in their entireties.

TECHNICAL FIELD

The present invention relates to the field of wireless communications technologies, and in particular, to a method for determining a transmit power in a coverage enhancement scenario and a device.

BACKGROUND

Internet of Things refers to a network of interconnection between people and things or between one thing and another by deploying various devices capable of, to some extent, perception, computation, execution and communication to obtain information of the physical world, and by means of information transmission, coordination and processing over the network. The Internet of Things may be applied to various aspects such as smart grid, intelligent agriculture, intelligent transportation, and environment check. Machine to machine (M2M) communication is a technology and a standardization concept that are proposed by the standardization organization-3$^{rd}$ Generation Partnership Project (3GPP) to research how to use a mobile communications network to carry applications of the Internet of Things, and a special project team is founded to research enhancement or optimization that needs to be performed on the mobile communications network due to introduction of machine type communication (MTC) devices.

Currently, in the 3GPP Long Term Evolution (LTE) project, a coverage enhancement research subject for the special application scenario of the MTC is proposed: providing coverage enhancement support for an MTC device that has a relatively great path loss (Pathloss, PL for short) when the MTC device is located in a basement or the like, so that the device can access the network to obtain a service. Signal repetition is one of methods for implementing coverage enhancement. Different MTC devices are located in different environments, and require different extents of coverage enhancement. Using signal repetition as an example, different MTC devices require different quantities of times of signal repetition.

According to the existing 3GPP protocols, a power of transmitting a random access preamble sequence in a random access process is determined according to the following formula:

$$P_{PRACH} = \min\{P_{CMAX,c(i)}, \text{PREAMBLE\_RECEIVED\_TARGET\_POWER} + PL_c\},$$

where $P_{CMAX,c(i)}$ is a maximum transmit power of a terminal, $PL_c$ is a path loss of the terminal, PREAMBLE_RECEIVED_TARGET_POWER is a target received power of a base station, and PREAMBLE_RECEIVED_TARGET_POWER=preambleInitialReceivedTargetPower+DELTA_PREAMBLE+(PREAMBLE_TRANSMISSION_COUNTER−1)*powerRampingStep, where preambleInitialReceivedTargerPower is an initial target received power of the base station, DELTA_PREAMBLE is an offset (as shown in Table 1) corresponding to a format (format) of the preamble sequence, PREAMBLE_TRANSMISSON_COUNTER is a quantity of attempts to transmit the preamble sequence by the terminal, and powerRampingStep is a power ramping step in each attempt to transmit the preamble sequence by the terminal.

TABLE 1

$DELTA\_PREAMBLE$ value table

| Random access preamble sequence format (Preamble Format) | $DELTA\_PREAMBLE$ value ($DELTA\_PREAMBLE$ value) |
|---|---|
| 0 | 0 dB |
| 1 | 0 dB |
| 2 | −3 dB |
| 3 | −3 dB |
| 4 | 8 dB |

It can be learned from the foregoing formula that the transmit power of transmitting the preamble sequence by the terminal fully compensates for the path loss. That is, in an ideal case, the terminal transmits the preamble sequence at PREAMBLE_RECEIVED_TARGET+$PL_c$. After undergoing the channel loss $PL_c$, the sequence arrives at the base station at the power of PREAMBLE_RECEIVED_TARGET_POWER. Without power ramping, the sequence arrives at the base station at the power of preambleInitialReceivedTargetPower.

However, in a coverage enhancement scenario, because the path loss $PL_c$ undergone by a signal is relatively great, PREAMBLE_RECEIVED_TARGET_POWER+$PL_c$ is far greater than the maximum transmit power $P_{CMAX,c(i)}$ of the terminal. Therefore, the following case may occur: A receiving requirement of the base station cannot be met even if the terminal transmits the preamble sequence at the maximum transmit power. In this case, coverage enhancement needs to be performed on the preamble sequence, for example, by transmitting the preamble sequence repeatedly. How to determine the power of transmitting the preamble sequence in the coverage enhancement scenario becomes an urgent problem to be resolved.

In summary, currently there is no solution to determining a power of transmitting a preamble sequence in a random access process in a coverage enhancement scenario.

SUMMARY

Embodiments of the present invention provide a method for determining a transmit power in a coverage enhancement scenario and a device, so as to determine a transmit power used for transmitting a signal in the coverage enhancement scenario.

According to a first aspect, a terminal is provided, where the terminal includes:

a configuration information obtaining module, configured to obtain configuration information that is used to determine a transmit power used for transmitting a signal at each coverage enhancement level; and a transmit power determining module, configured to determine, according to the configuration information, a transmit power used for transmitting the signal at a coverage enhancement level currently used by the terminal.

With reference to the first aspect, in a first possible implementation manner, the configuration information is agreed between the terminal and a network side, or the configuration information is configured by a network side and then transmitted to the terminal.

With reference to the first aspect or the first possible implementation manner of the first aspect, in a second possible implementation manner, if the configuration information includes a quantity of repetition times required for the signal to be transmitted at each coverage enhancement level, the transmit power determining module is specifically configured to:

according to the quantity of repetition times included in the configuration information, determine a quantity of repetition times required for the signal to be transmitted at the coverage enhancement level currently used by the terminal; and according to the determined quantity of repetition times, determine the transmit power used for transmitting the signal at the coverage enhancement level currently used by the terminal.

With reference to the second possible implementation manner of the first aspect, in a third possible implementation manner, the transmit power determining module is specifically configured to:

according to a correspondence between a quantity of repetition times and a power compensation value, determine a power compensation value corresponding to the quantity of repetition times required for the signal to be transmitted at the coverage enhancement level currently used by the terminal; and according to the determined power compensation value, determine the transmit power used for transmitting the signal at the coverage enhancement level currently used by the terminal.

With reference to the first aspect or the first possible implementation manner of the first aspect, in a fourth possible implementation manner, if the configuration information includes a power compensation value corresponding to each coverage enhancement level, the transmit power determining module is specifically configured to:

according to the power compensation values included in the configuration information, determine a power compensation value corresponding to the coverage enhancement level currently used by the terminal; and according to the determined power compensation value, determine the transmit power used for transmitting the signal at the coverage enhancement level currently used by the terminal.

With reference to the third possible implementation manner of the first aspect or the fourth possible implementation manner of the first aspect, in a fifth possible implementation manner, the transmit power determining module determines, according to the following formula, the transmit power used for transmitting the signal at the coverage enhancement level currently used by the terminal:

$$P=\min\{P_{MAX}, \text{PREAMBLE\_RECEIVED\_TARGET\_POWER\_}CI+PL\}$$

where P is the transmit power of transmitting the signal by the terminal, $P_{MAX}$ is a maximum transmit power of the terminal, PREAMBLE_RECEIVED_TARGET_POWER_CI is a target received power determined according to the power compensation value corresponding to the coverage enhancement level currently used by the terminal, and PL is a path loss.

With reference to the fifth possible implementation manner of the first aspect, in a sixth possible implementation manner, the transmit power determining module determines the target received power according to the following formula:

$$\text{PREAMBLE\_RECEIVED\_TARGET\_POWER\_}CI= \text{preambleInitialReceivedTargetPower}+ \text{DELTA\_PREAMBLE\_}G_{Ri}; \text{ or,}$$

$$\text{PREAMBLE\_RECEIVED\_TARGET\_POWER\_}CI= \text{preambleInitialReceivedTargerPower}+ \text{DELTA\_PREAMBLE\_}G_{Ri}+(\text{PREAMBLE\_TRANSMISSION\_COUNTER\_}CI-1)*\text{powerRampingStep\_}CI,$$

where $G_{Ri}$ is the power compensation value, preambleInitialReceivedTargerPower is an initial target received power, DELTA_PREAMBLE is an offset corresponding to a format of the signal transmitted by the terminal, PREAMBLE_TRANSMISSION_COUNTER_CI is a quantity of signal transmitting attempts at the coverage enhancement level currently used by the terminal, and powerRampingStep_CI is a power ramping step in each signal transmitting attempt at the coverage enhancement level currently used by the terminal.

With reference to the sixth possible implementation manner of the first aspect, in a seventh possible implementation manner, the determining, by the transmit power determining module, the target received power includes: determining that a value of DELTA_PREAMBLE is 0.

With reference to the sixth possible implementation manner of the first aspect or the seventh possible implementation manner of the first aspect, in an eighth possible implementation manner, the transmit power determining module is specifically configured to:

when the configuration information carries a maximum quantity of signal transmitting attempts corresponding to each coverage enhancement level, determine, from the configuration information, a maximum quantity of signal transmitting attempts at the coverage enhancement level currently used by the terminal; or when the configuration information carries a total of maximum quantities of signal transmitting attempts corresponding to all the coverage enhancement levels, determine a maximum quantity of signal transmitting attempts at each coverage enhancement level according to the total of quantities of attempts carried in the configuration information, and determine, according to the coverage enhancement level currently used by the terminal, a maximum quantity of signal transmitting attempts at the coverage enhancement level currently used by the terminal.

With reference to the sixth possible implementation manner of the first aspect or the seventh possible implementation manner of the first aspect or the eighth possible implementation manner of the first aspect, in a ninth possible implementation manner, the transmit power determining module is specifically configured to:

when the configuration information carries a power ramping step in each signal transmitting attempt corresponding to each coverage enhancement level, determine, from the configuration information, the power ramping step in each signal transmitting attempt at the coverage enhancement level currently used by the terminal; or when the configuration information carries a total of power ramping steps after the signal is transmitted repeatedly for N times in each attempt corresponding to each coverage enhancement level, determine, from the configuration information, a total of power ramping steps after the signal is transmitted repeatedly for N times in each attempt corresponding to the coverage enhancement level currently used by the terminal; and according to the determined total of power ramping steps, determine the power ramping step in each signal transmitting attempt at the coverage enhancement level currently used by the terminal.

With reference to the sixth possible implementation manner of the first aspect or the seventh possible implementation manner of the first aspect or the eighth possible implementation manner of the first aspect or the ninth possible implementation manner of the first aspect, in a tenth possible implementation manner, after the terminal switches the currently used coverage enhancement level, the transmit power determining module is further configured to:

according to the power compensation value corresponding to the coverage enhancement level used by the terminal before the switching and a power compensation value corresponding to a coverage enhancement level used after the switching, determine a transmit power used for transmitting the signal at the coverage enhancement level used after the switching, where the coverage enhancement level used by the terminal after the switching is higher than the coverage enhancement level used by the terminal before the switching.

With reference to the tenth possible implementation manner of the first aspect, in an eleventh possible implementation manner, the transmit power determining module determines, according to the following formula, the transmit power used for transmitting the signal at the coverage enhancement level used after the switching:

$$\begin{cases} P_i \geq P_{i-1} + G_{Ri-1} - G_{Ri}, & (P_{i-1} + G_{Ri-1} - G_{Ri}) < P_{MAX} \\ P_i = P_{MAX}, & (P_{i-1} + G_{Ri-1} - G_{Ri}) \geq P_{MAX} \end{cases},$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, and $G_{Ri-1}$ is the power compensation value corresponding to the coverage enhancement level of the terminal before the switching.

With reference to the tenth possible implementation manner of the first aspect, in a twelfth possible implementation manner, the transmit power determining module determines, according to the following formula, the transmit power used for transmitting the signal at the coverage enhancement level used after the switching:

$$\begin{cases} P_i \geq P_{i-1} + G_{Ri-1} - G_{Ri} + & (P_{i-1} + G_{Ri-1} - G_{Ri} + \\ \text{powerRampingStep\_CI\_i}, & \text{powerRampingStep\_CI\_i}) < P_{MAX} \\ P_i = P_{MAX}, & (P_{i-1} + G_{Ri-1} - G_{Ri} + \\ & \text{powerRampingStep\_CI\_i}) \geq P_{MAX} \end{cases},$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, $G_{Ri-1}$ is the power compensation value corresponding to the coverage enhancement level of the terminal before the switching, and powerRampingStep_CI_i is a power ramping step of the terminal in each signal transmitting attempt at the coverage enhancement level used after the switching.

With reference to the tenth possible implementation manner of the first aspect or the eleventh possible implementation manner of the first aspect, in a thirteenth possible implementation manner, the transmit power determining module determines, according to the following formula, the transmit power used for transmitting the signal at the coverage enhancement level used after the switching, until a currently determined transmit power reaches the maximum transmit power of the terminal:

$$P'=P_i+(\text{PREAMBLE\_TRANSMISSION\_COUNTER\_CI\_i}-1)*\text{powerRampingStep\_CI\_i},$$

where P' is the current transmit power determined by the terminal for transmitting the signal, and PREAMBLE_TRANSMISSION_COUNTER_CI_i is a maximum quantity of signal transmitting attempts made by the terminal at the coverage enhancement level used after the switching.

With reference to the thirteenth possible implementation manner of the first aspect, in a fourteenth possible implementation manner, a value of PREAMBLE_TRANSMISSION_COUNTER_CI_i falls within $[1, \ldots, N_i]$, and $N_i$ is the maximum quantity of signal transmitting attempts made by the terminal at the coverage enhancement level used after the switching; or a value of PREAMBLE_TRANSMISSION_COUNTER_CI_i falls within $[N'+1, \ldots, N'+N_i]$, N' is a total of maximum quantities of signal transmitting attempts made by the terminal before switching the coverage enhancement level, and $N_i$ is the maximum quantity of signal transmitting attempts made by the terminal at the coverage enhancement level used after the switching.

With reference to any implementation manner of the tenth to the fourteenth possible implementation manners of the first aspect, in a fifteenth possible implementation manner, the transmit power determining module is specifically configured to:

when the currently determined transmit power is the maximum transmit power of the terminal, if it is determined that the network side receives no signal transmitted by the terminal, switch the coverage enhancement level used by the terminal.

With reference to any implementation manner of the third to the fourteenth possible implementation manners of the first aspect, in a sixteenth possible implementation manner, the transmit power determining module is further configured to:

when the power compensation value cannot be obtained according to the configuration information, determine that the transmit power used by the terminal for transmitting the signal is the maximum transmit power of the terminal.

According to a second aspect, a terminal is provided, where the terminal includes a transceiver, and at least one processor connected to the transceiver, where the processor is configured to obtain configuration information that is used to determine a transmit power used for transmitting a signal at each coverage enhancement level; and according to the obtained configuration information, determine a transmit power used for transmitting the signal at a coverage enhancement level currently used by the terminal.

With reference to the second aspect, in a first possible implementation manner, the configuration information is agreed between the terminal and a network side, or the configuration information is configured by a network side and then transmitted to the terminal. If the configuration information is configured by the network side, the transceiver is configured to receive the configuration information transmitted by the network side.

With reference to the second aspect or the first possible implementation manner of the second aspect, in a second possible implementation manner, if the configuration information includes a quantity of repetition times required for the signal to be transmitted at each coverage enhancement level, the processor is specifically configured to:

according to the quantity of repetition times included in the configuration information, determine a quantity of repetition times required for the signal to be transmitted at the coverage enhancement level currently used by the terminal; and according to the determined quantity of repetition times, determine the transmit power used for transmitting the signal at the coverage enhancement level currently used by the terminal.

With reference to the second possible implementation manner of the second aspect, in a third possible implementation manner, the processor is specifically configured to:

according to a correspondence between a quantity of repetition times and a power compensation value, determine a power compensation value corresponding to the quantity of repetition times required for the signal to be transmitted at the coverage enhancement level currently used by the terminal; and according to the determined power compensation value, determine the transmit power used for transmitting the signal at the coverage enhancement level currently used by the terminal.

With reference to the second aspect or the first possible implementation manner of the second aspect, in a fourth possible implementation manner, if the configuration information includes a power compensation value corresponding to each coverage enhancement level, the processor is specifically configured to:

according to the power compensation values included in the configuration information, determine a power compensation value corresponding to the coverage enhancement level currently used by the terminal; and according to the determined power compensation value, determine the transmit power used for transmitting the signal at the coverage enhancement level currently used by the terminal.

With reference to the third possible implementation manner of the second aspect or the fourth possible implementation manner of the second aspect, in a fifth possible implementation manner, the processor determines, according to the following formula, the transmit power used for transmitting the signal at the coverage enhancement level currently used by the terminal:

$$P=\min\{P_{MAX}, \text{PREAMBLE\_RECEIVED\_TARGET\_POWER\_}CI+PL\},$$

where P is the transmit power of transmitting the signal by the terminal, $P_{MAX}$ is a maximum transmit power of the terminal, PREAMBLE_RECEIVED_TARGET_POWER_CI s a target received power determined according to the power compensation value corresponding to the coverage enhancement level currently used by the terminal, and PL is a path loss.

With reference to the fifth possible implementation manner of the second aspect, in a sixth possible implementation manner, the processor determines the target received power according to the following formula:

$$\text{PREAMBLE\_RECEIVED\_TARGET\_POWER\_}CI= \text{preambleInitialReceivedTargerPower}+\text{DELTA\_PREAMBLE\_}G_{Ri}; \text{ or,}$$

$$\text{PREAMBLE\_RECEIVED\_TARGET\_POWER\_}CI= \text{preambleInitialReceivedTargerPower}+\text{DELTA\_PREAMBLE\_}G_{Ri}+(\text{PREAMBLE\_TRANSMISSION\_COUNTER\_}CI-1)*\text{powerRampingStep\_}CI,$$

where $G_{Ri}$ is the power compensation value, preambleInitialReceivedTargerPower is an initial target received power, DELTA_PREAMBLE is an offset corresponding to a format of the signal transmitted by the terminal, PREAMBLE_TRANSMISSION_COUNTER_CI is a quantity of signal transmitting attempts at the coverage enhancement level currently used by the terminal, and powerRampingStep_CI is a power ramping step in each signal transmitting attempt at the coverage enhancement level currently used by the terminal.

With reference to the sixth possible implementation manner of the second aspect, in a seventh possible implementation manner, the determining, by the processor, the target received power includes: determining that a value of DELTA_PREAMBLE is 0.

With reference to the sixth possible implementation manner of the second aspect or the seventh possible implementation manner of the second aspect, in an eighth possible implementation manner, the processor is specifically configured to:

when the configuration information carries a maximum quantity of signal transmitting attempts corresponding to each coverage enhancement level, determine, from the configuration information, a maximum quantity of signal transmitting attempts at the coverage enhancement level currently used by the terminal; or when the configuration information carries a total of maximum quantities of signal transmitting attempts corresponding to all the coverage enhancement levels, determine a maximum quantity of signal transmitting attempts at each coverage enhancement level according to the total of quantities of attempts carried in the configuration information, and determine, according to the coverage enhancement level currently used by the terminal, a maximum quantity of signal transmitting attempts at the coverage enhancement level currently used by the terminal.

With reference to the sixth possible implementation manner of the second aspect or the seventh possible implementation manner of the second aspect or the eighth possible implementation manner of the second aspect, in a ninth possible implementation manner, the processor is specifically configured to:

when the configuration information carries a power ramping step in each signal transmitting attempt corresponding to each coverage enhancement level, determine, from the configuration information, the power ramping step in each signal transmitting attempt at the coverage enhancement level currently used by the terminal; or when the configuration information carries a total of power ramping steps after the signal is transmitted repeatedly for N times in each attempt corresponding to each coverage enhancement level, determine, from the configuration information, a total of power ramping steps after the signal is transmitted repeatedly for N times in each attempt corresponding to the coverage enhancement level currently used by the terminal; and according to the determined total of power ramping steps, determine the power ramping step in each signal transmitting attempt at the coverage enhancement level currently used by the terminal.

With reference to the sixth possible implementation manner of the second aspect or the seventh possible implementation manner of the second aspect or the eighth possible implementation manner of the second aspect or the ninth possible implementation manner of the second aspect, in a tenth possible implementation manner, after the terminal switches the currently used coverage enhancement level, the processor is further configured to:

according to the power compensation value corresponding to the coverage enhancement level used by the terminal before the switching and a power compensation value corresponding to a coverage enhancement level used after the switching, determine a transmit power used for transmitting the signal at the coverage enhancement level used after the switching, where the coverage enhancement level used by the terminal after the switching is higher than the coverage enhancement level used by the terminal before the switching.

With reference to the tenth possible implementation manner of the second aspect, in an eleventh possible implementation manner, the processor determines, according to the following formula, the transmit power used for transmitting the signal at the coverage enhancement level used after the switching:

$$\begin{cases} P_i \geq P_{i-1} + G_{Ri-1} - G_{Ri}, & (P_{i-1} + G_{Ri-1} - G_{Ri}) < P_{MAX} \\ P_i = P_{MAX}, & (P_{i-1} + G_{Ri-1} - G_{Ri}) \geq P_{MAX} \end{cases},$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, and $G_{Ri-1}$ is the power compensation value corresponding to the coverage enhancement level of the terminal before the switching.

With reference to the tenth possible implementation manner of the second aspect, in a twelfth possible implementation manner, the processor determines, according to the following formula, the transmit power used for transmitting the signal at the coverage enhancement level used after the switching:

$$\begin{cases} P_i \geq P_{i-1} + G_{Ri-1} - G_{Ri} + \text{powerRampingStep\_CI\_i}, & (P_{i-1} + G_{Ri-1} - G_{Ri} + \text{powerRampingStep\_CI\_i}) < P_{MAX} \\ P_i = P_{MAX}, & (P_{i-1} + G_{Ri-1} - G_{Ri} + \text{powerRampingStep\_CI\_i}) \geq P_{MAX} \end{cases},$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, $G_{Ri-1}$ is the power compensation value corresponding to the coverage enhancement level of the terminal before the switching, and powerRampingStep_CI_i is a power ramping step of the terminal in each signal transmitting attempt at the coverage enhancement level used after the switching.

With reference to the tenth possible implementation manner of the second aspect or the eleventh possible implementation manner of the second aspect, in a thirteenth possible implementation manner, the processor determines, according to the following formula, the transmit power used for transmitting the signal at the coverage enhancement level used after the switching, until a currently determined transmit power reaches the maximum transmit power of the terminal:

$$P'=P_i+(\text{PREAMBLE\_TRANSMISSION\_COUNTER\_CI\_i}-1)*\text{powerRampingStep\_CI\_i},$$

where P' is the current transmit power determined by the terminal for transmitting the signal, and PREAMBLE_TRANSMISSION_COUNTER_CI_i is a maximum quantity of signal transmitting attempts made by the terminal at the coverage enhancement level used after the switching.

With reference to the thirteenth possible implementation manner of the second aspect, in a fourteenth possible implementation manner, a value of PREAMBLE_TRANSMISSION_COUNTER_CI_i falls within $[1, \ldots, N_i]$, and $N_i$ is the maximum quantity of signal transmitting attempts made by the terminal at the coverage enhancement level used after the switching; or a value of PREAMBLE_TRANSMISSION_COUNTER_CI_i falls within $[N'+1, \ldots, N'+N_i]$, N' is a total of maximum quantities of signal transmitting attempts made by the terminal before switching the coverage enhancement level, and $N_i$ is the maximum quantity of signal transmitting attempts made by the terminal at the coverage enhancement level used after the switching.

With reference to any implementation manner of the tenth to the fourteenth possible implementation manners of the second aspect, in a fifteenth possible implementation manner, the processor is specifically configured to:

when the currently determined transmit power is the maximum transmit power of the terminal, if it is determined that the network side receives no signal transmitted by the terminal, switch the coverage enhancement level used by the terminal.

With reference to any implementation manner of the third to the fourteenth possible implementation manners of the second aspect, in a sixteenth possible implementation manner, the processor is further configured to:

when the power compensation value cannot be obtained according to the configuration information, determine that the transmit power used by the terminal for transmitting the signal is the maximum transmit power of the terminal.

According to a third aspect, a network-side device is provided, where the network-side device includes:

a configuration module, configured to configure configuration information that is used to determine a transmit power used for transmitting a signal at each coverage enhancement level; and a transmit module, configured to transmit the configuration information to a terminal served by the network-side device, so that the terminal determines, according to the configuration information, a transmit power used for transmitting the signal at a coverage enhancement level currently used by the terminal.

With reference to the third aspect, in a first possible implementation manner, the configuration information includes at least one of the following information:

a power compensation value corresponding to each coverage enhancement level;

a quantity of repetition times required for the signal to be transmitted at each coverage enhancement level;

a maximum quantity of signal transmitting attempts at each coverage enhancement level;

a total of maximum quantities of signal transmitting attempts at all the coverage enhancement levels;

a power ramping step in each signal transmitting attempt corresponding to each coverage enhancement level; or a total of power ramping steps after the signal is transmitted repeatedly for N times in each attempt corresponding to each coverage enhancement level.

According to a fourth aspect, a network-side device is provided, where the network-side device includes a transceiver, and at least one processor connected to the transceiver, where the processor is configured to configure configuration information that is used to determine a transmit power used for transmitting a signal at each coverage enhancement level; and the transceiver is configured to transmit the configuration information to a terminal served by the network-side device, so that the terminal determines, according to the configuration information, a transmit power used for transmitting the signal at a coverage enhancement level currently used by the terminal.

With reference to the fourth aspect, in a first possible implementation manner, the configuration information includes at least one of the following information:

a power compensation value corresponding to each coverage enhancement level;

a quantity of repetition times required for the signal to be transmitted at each coverage enhancement level;

a maximum quantity of signal transmitting attempts at each coverage enhancement level;

a total of maximum quantities of signal transmitting attempts at all the coverage enhancement levels;

a power ramping step in each signal transmitting attempt corresponding to each coverage enhancement level; or a total of power ramping steps after the signal is transmitted repeatedly for N times in each attempt corresponding to each coverage enhancement level.

According to a fifth aspect, a method for determining a transmit power in a coverage enhancement scenario is provided, where the method includes:

obtaining, by a terminal, configuration information that is used to determine a transmit power used for transmitting a signal at each coverage enhancement level; and determining, by the terminal according to the configuration information, a transmit power used for transmitting the signal at a coverage enhancement level currently used by the terminal.

With reference to the fifth aspect, in a first possible implementation manner, the configuration information is agreed between the terminal and a network side, or the configuration information is configured by a network side and transmitted to the terminal.

With reference to the fifth aspect or the first possible implementation manner of the fifth aspect, in a second possible implementation manner, if the configuration information includes a quantity of repetition times required for the signal to be transmitted at each coverage enhancement level, the determining, by the terminal according to the configuration information, a transmit power used for transmitting the signal at a coverage enhancement level currently used by the terminal includes:

determining, by the terminal according to the quantity of repetition times included in the configuration information, a quantity of repetition times required by the signal to be transmitted at the coverage enhancement level currently used by the terminal; and determining, by the terminal according to the determined quantity of repetition times, the transmit power used for transmitting the signal at the coverage enhancement level currently used by the terminal.

With reference to the second possible implementation manner of the fifth aspect, in a third possible implementation manner, the determining, by the terminal according to the configuration information, a transmit power used for transmitting the signal at a coverage enhancement level currently used by the terminal includes:

determining, by the terminal according to a correspondence between a quantity of repetition times and a power compensation value, a power compensation value corresponding to the quantity of repetition times required for the signal to be transmitted at the coverage enhancement level currently used by the terminal; and determining, by the terminal according to the determined power compensation value, the transmit power used for transmitting the signal at the coverage enhancement level currently used by the terminal.

With reference to the fifth aspect or the first possible implementation manner of the fifth aspect, in a fourth possible implementation manner, if the configuration information includes a power compensation value corresponding to each coverage enhancement level, the determining, by the terminal according to the configuration information, a transmit power used for transmitting the signal at a coverage enhancement level currently used by the terminal includes:

determining, by the terminal according to the power compensation values included in the configuration information, a power compensation value corresponding to the coverage enhancement level currently used by the terminal; and determining, by the terminal according to the determined power compensation value, the transmit power used for transmitting the signal at the coverage enhancement level currently used by the terminal.

With reference to the third possible implementation manner of the fifth aspect or the fourth possible implementation manner of the fifth aspect, in a fifth possible implementation manner, the terminal determines, according to the following formula, the transmit power used for transmitting the signal at the coverage enhancement level currently used by the terminal:

$$P=\min\{P_{MAX}, \text{PREAMBLE\_RECEIVED\_TARGET\_POWER\_}CI+PL\},$$

where P is the transmit power of transmitting the signal by the terminal, $P_{MAX}$ is a maximum transmit power of the terminal, PREAMBLE_RECEIVED_TARGET_POWER_$CI$ is a target received power determined by the terminal according to the power compensation value corresponding to the coverage enhancement level currently used by the terminal, and PL is a path loss.

With reference to the fifth possible implementation manner of the fifth aspect, in a sixth possible implementation manner, the terminal determines the target received power according to the following formula:

PREAMBLE_RECEIVED_TARGET_POWER_$CI$=
preambleInitialReceivedTargerPower+DELTA_PREAMBLE_$G_{Ri}$; or, PREAMBLE_RECEIVED_TARGET_POWER_$CI$=
preambleInitialReceivedTargetPower+DELTA_PREAMBLE_$G_{Ri}$+(PREAMBLE_TRANSMISSION_COUNTER_$CI$−1)*powerRampingStep_$CI$, where $G_{Ri}$ is the power compensation value, preamble-InitialReceivedTargerPower is an initial target received power, DELTA_PREAMBLE is an offset corresponding to a format of the signal transmitted by the terminal, PREAMBLE_TRANSMISSION_COUNTER_CI is a quantity of signal transmitting attempts made by the terminal at the coverage enhancement level currently used by the terminal, and powerRampingStep_CI is a power ramping step of the terminal in each signal transmitting attempt at the coverage enhancement level currently used by the terminal.

With reference to the sixth possible implementation manner of the fifth aspect, in a seventh possible implementation manner, the determining, by the terminal, the target received power includes: determining, by the terminal, that a value of DELTA_PREAMBLE is 0.

With reference to the sixth possible implementation manner of the fifth aspect or the seventh possible implementation manner of the fifth aspect, in an eighth possible implementation manner, the determining, by the terminal, the quantity of signal transmitting attempts at the coverage enhancement level currently used by the terminal includes:

when the configuration information carries a maximum quantity of signal transmitting attempts corresponding to each coverage enhancement level, determining, by the terminal from the configuration information, a maximum quantity of signal transmitting attempts at the coverage enhancement level currently used by the terminal; or when the configuration information carries a total of maximum quantities of signal transmitting attempts corresponding to all the coverage enhancement levels, determining, by the terminal, a maximum quantity of signal transmitting attempts at each coverage enhancement level of the terminal according to the total of quantities of attempts carried in the configuration information, and determining, according to the coverage enhancement level currently used by the terminal, a maximum quantity of signal transmitting attempts at the coverage enhancement level currently used by the terminal.

With reference to the sixth possible implementation manner of the fifth aspect or the seventh possible implementation manner of the fifth aspect or the eighth possible implementation manner of the fifth aspect, in a ninth possible implementation manner, the determining, by the terminal, the power ramping step in each signal transmitting attempt at the coverage enhancement level currently used by the terminal includes:

when the configuration information carries a power ramping step in each signal transmitting attempt corresponding to each coverage enhancement level, determining, by the terminal from the configuration information, the power ramping step in each signal transmitting attempt at the coverage enhancement level currently used by the terminal; or when the configuration information carries a total of power ramping steps after the signal is transmitted repeatedly for N times in each attempt corresponding to each coverage enhancement level, determining, by the terminal from the configuration information, a total of power ramping steps after the signal is transmitted repeatedly for N times in each attempt corresponding to the coverage enhancement level currently used by the terminal; and according to the determined total of power ramping steps, determining the power ramping step in each signal transmitting attempt at the coverage enhancement level currently used by the terminal.

With reference to the sixth possible implementation manner of the fifth aspect or the seventh possible implementation manner of the fifth aspect or the eighth possible implementation manner of the fifth aspect or the ninth possible implementation manner of the fifth aspect, in a tenth possible implementation manner, after the terminal switches the currently used coverage enhancement level, the method further includes:

determining, by the terminal according to the power compensation value corresponding to the coverage enhancement level used before the switching and a power compensation value corresponding to a coverage enhancement level used after the switching, a transmit power used for transmitting the signal at the coverage enhancement level used after the switching, where the coverage enhancement level used by the terminal after the switching is higher than the coverage enhancement level used by the terminal before the switching.

With reference to the tenth possible implementation manner of the fifth aspect, in an eleventh possible implementation manner, the terminal determines, according to the following formula, the transmit power used for transmitting the signal at the coverage enhancement level used after the switching:

$$\begin{cases} P_i \geq P_{i-1} + G_{Ri-1} - G_{Ri}, & (P_{i-1} + G_{Ri-1} - G_{Ri}) < P_{MAX} \\ P_i = P_{MAX}, & (P_{i-1} + G_{Ri-1} - G_{Ri}) \geq P_{MAX} \end{cases},$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, and $G_{Ri-1}$ is the power compensation value corresponding to the coverage enhancement level of the terminal before the switching.

With reference to the tenth possible implementation manner of the fifth aspect, in a twelfth possible implementation manner, the terminal determines, according to the following formula, the transmit power used for transmitting the signal at the coverage enhancement level used after the switching:

$$\begin{cases} P_i \geq P_{i-1} + G_{Ri-1} - G_{Ri} + & (P_{i-1} + G_{Ri-1} - G_{Ri} + \\ \text{powerRampingStep\_CI\_i}, & \text{powerRampingStep\_CI\_i}) < P_{MAX} \\ P_i = P_{MAX}, & (P_{i-1} + G_{Ri-1} - G_{Ri} + \\ & \text{powerRampingStep\_CI\_i}) \geq P_{MAX} \end{cases},$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, $G_{Ri-1}$ is the power compensation value corresponding to the coverage enhancement level of the terminal before the switching, and powerRampingStep_CI_i is a power ramping step of the terminal in each signal transmitting attempt at the coverage enhancement level used after the switching.

With reference to the tenth possible implementation manner of the fifth aspect or the eleventh possible implementation manner of the fifth aspect, in a thirteenth possible implementation manner, the terminal determines, according to the following formula, the transmit power used for transmitting the signal at the coverage enhancement level used after the switching, until a currently determined transmit power reaches the maximum transmit power of the terminal:

$$P'=P_f+(\text{PREAMBLE\_TRANSMISSION\_COUNTER\_CI\_i}-1)*\text{powerRampingStep\_CI\_i},$$

where P' is the current transmit power determined by the terminal for transmitting the signal, and PREAMBLE_TRANSMISSION_COUNTER_CI_i is a maximum quantity of signal transmitting attempts made by the terminal at the coverage enhancement level used after the switching.

With reference to the thirteenth possible implementation manner of the fifth aspect, in a fourteenth possible implementation manner, a value of PREAMBLE_TRANSMISSION_COUNTER_CI_i falls within $[1, \ldots, N_i]$, and $N_i$ is the maximum quantity of signal transmitting attempts made by the terminal at the coverage enhancement level used after the switching; or a value of PREAMBLE_TRANSMISSION_COUNTER_CI_i falls within $[N'+1, \ldots, N'+N_i]$, N' is a total of maximum quantities of signal transmitting attempts made by the terminal before switching the coverage enhancement level, and $N_i$ is the maximum quantity of signal transmitting attempts made by the terminal at the coverage enhancement level used after the switching.

With reference to any implementation manner of the tenth to the fourteenth possible implementation manners of the fifth aspect, in a fifteenth possible implementation manner, the terminal switches the used coverage enhancement level according to the following step:

when the currently determined transmit power is the maximum transmit power of the terminal, if the terminal determines that the network side receives no signal transmitted by the terminal, switching, by the terminal, the coverage enhancement level used by the terminal.

With reference to any implementation manner of the third to the fourteenth possible implementation manners of the fifth aspect, in a sixteenth possible implementation manner, the determining, by the terminal according to the configuration information, a transmit power used for transmitting the signal at a coverage enhancement level currently used by the terminal includes:

when the power compensation value cannot be obtained according to the configuration information, determining, by the terminal, that the transmit power used by the terminal for transmitting the signal is the maximum transmit power of the terminal.

According to a sixth aspect, a method for determining a transmit power in a coverage enhancement scenario is provided, where the method includes:

configuring, by a network side, configuration information that is used to determine a transmit power used for transmitting a signal at each coverage enhancement level; and transmitting, by the network side, the configuration information to a terminal served by the network side, so that the terminal determines, according to the configuration information, a transmit power used for transmitting the signal at a coverage enhancement level currently used by the terminal.

With reference to the sixth aspect, in a first possible implementation manner, the configuration information includes at least one of the following information:

a power compensation value corresponding to each coverage enhancement level;

a quantity of repetition times required for the signal to be transmitted at each coverage enhancement level;

a maximum quantity of signal transmitting attempts at each coverage enhancement level;

a total of maximum quantities of signal transmitting attempts at all the coverage enhancement levels;

a power ramping step in each signal transmitting attempt corresponding to each coverage enhancement level; or a total of power ramping steps after the signal is transmitted repeatedly for N times in each attempt corresponding to each coverage enhancement level.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
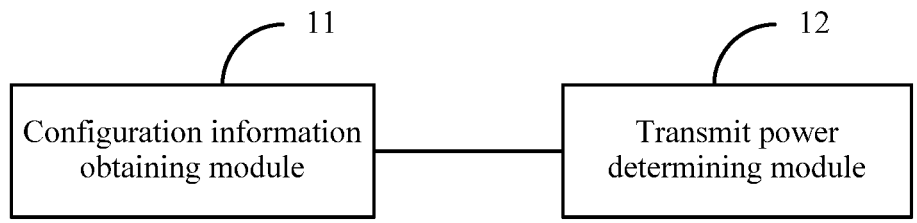
FIG. 1 is a schematic diagram of a terminal according to the present invention.

The present invention provides a terminal. As shown in FIG. 1, the terminal includes:

a configuration information obtaining module 11, configured to obtain configuration information that is used to determine a transmit power used for transmitting a signal at each coverage enhancement level; and a transmit power determining module 12, configured to determine, according to the configuration information obtained by the configuration information obtaining module 11, a transmit power used for transmitting the signal at a coverage enhancement level currently used by the terminal.

The terminal provided in the present invention obtains the configuration information that is used to determine the transmit power used for transmitting the signal at each coverage enhancement level, and according to the obtained configuration information, determines the transmit power used for transmitting the signal at the coverage enhancement level currently used by the terminal, so as to determine the transmit power used for transmitting the signal in the coverage enhancement scenario.

The terminal provided in the present invention may determine, according to the obtained configuration information, a transmit power used for transmitting a random access preamble sequence in the coverage enhancement scenario, or may determine a transmit power used when transmitting another signal or data in the coverage enhancement scenario.

In implementation, the configuration information obtained by the configuration information obtaining module 11 may be agreed between the terminal and a network side, or may be configured by a network side and then transmitted to the terminal. This embodiment of the present invention does not limit a method for obtaining the configuration information.

Based on any of the foregoing embodiments, in a first implementation manner, if the configuration information obtained by the configuration information obtaining module 11 includes a quantity of repetition times required for the signal to be transmitted at each coverage enhancement level, the transmit power determining module 12 is specifically configured to:

according to the quantity of repetition times included in the configuration information, determine a quantity of repetition times required for the signal to be transmitted at the coverage enhancement level currently used by the terminal; and according to the determined quantity of repetition times, determine the transmit power used for transmitting the signal at the coverage enhancement level currently used by the terminal.

Further, in a preferred implementation manner, the transmit power determining module 12 is specifically configured to:

according to a correspondence between a quantity of repetition times and a power compensation value, determine a power compensation value corresponding to the quantity of repetition times required for the signal to be transmitted at the coverage enhancement level currently used by the terminal; and according to the determined power compensation value, determine the transmit power used for transmitting the signal at the coverage enhancement level currently used by the terminal.

Except the foregoing preferred implementation manner, alternatively, the transmit power determining module 12 may determine, according to the following step, the transmit power used for transmitting the signal at the coverage enhancement level currently used by the terminal:

determining, according to a correspondence between a quantity of repetition times and a transmit power, a transmit power corresponding to the quantity of repetition times required for the signal to be transmitted at the coverage enhancement level currently used by the terminal.

Based on any of the foregoing embodiments, in a second implementation manner, if the configuration information obtained by the configuration information obtaining module 11 includes a power compensation value corresponding to each coverage enhancement level, the transmit power determining module 12 is specifically configured to:

according to the power compensation values included in the configuration information, determine a power compensation value corresponding to the coverage enhancement level currently used by the terminal; and according to the determined power compensation value, determine the transmit power used for transmitting the signal at the coverage enhancement level currently used by the terminal.

Based on the foregoing embodiment, preferably, during configuration of the power compensation value $G_{Ri}$, different coverage enhancement levels correspond to different power compensation values $G_{Ri}$, and a higher coverage enhancement level corresponds to a greater power compensation value $G_{Ri}$.

Certainly, during configuration of the power compensation value $G_{Ri}$, different coverage enhancement levels may correspond to a same power compensation value $G_{Ri}$; or some coverage enhancement levels may correspond to a same power compensation value $G_{Ri}$ while some coverage enhancement levels may correspond to different power compensation values $G_{Ri}$.

By using a random access process of a terminal as an example (that is, a signal transmitted by the terminal is a random access preamble sequence (preamble)), the following describes a process for determining a transmit power used by the terminal for transmitting the signal. A process for determining a transmit power used for transmitting another signal is similar, and is not described exhaustively herein with examples.

In implementation, the transmit power determining module 12 determines, according to the determined power compensation value and according to Formula 1 as follows, the transmit power used for transmitting the signal at the coverage enhancement level currently used by the terminal:

$$P = \min\{P_{MAX}, \text{PREAMBLE\_RECEIVED\_TARGET\_POWER\_}CI + PL\} \quad \text{Formula 1,}$$

where P is the transmit power of transmitting the signal by the terminal, $P_{MAX}$ is a maximum transmit power of the terminal, PREAMBLE_RECEIVED_TARGET_POWER_CI is a target received power determined according to the power compensation value corresponding to the coverage enhancement level currently used by the terminal, and PL is a path loss.

Further, the transmit power determining module 12 determines the target received power PREAMBLE_RECEIVED_TARGET_POWER_CI according to Formula 2 or Formula 3 as follows:

$$\text{PREAMBLE\_RECEIVED\_TARGET\_POWER\_}CI = \text{preambleInitialReceivedTargerPower} + \text{DELTA\_PREAMBLE\_}G_{Ri} \quad \text{Formula 2; or}$$

$$\text{PREAMBLE\_RECEIVED\_TARGET\_POWER\_}CI = \text{preambleInitialReceivedTargerPower} + \text{DELTA\_PREAMBLE\_}G_{Ri} + (\text{PREAMBLE\_TRANSMISSION\_COUNTER\_}CI - 1) * \text{powerRampingStep\_}CI \quad \text{Formula 3.}$$

In Formula 2 and Formula 3 described above, $G_{Ri}$ is the power compensation value, preambleInitialReceivedTargerPower is an initial target received power, DELTA_PREAMBLE is an offset corresponding to a format of the signal transmitted by the terminal, PREAMBLE_TRANSMISSION_COUNTER_CI is a quantity of signal transmitting attempts at the coverage enhancement level currently used by the terminal, and powerRampingStep_CI is a power ramping step in each signal transmitting attempt at the coverage enhancement level currently used by the terminal.

Specifically, if power ramping is not considered, the transmit power determining module 12 uses Formula 2 to determine the target received power; if power ramping is considered, the transmit power determining module 12 uses Formula 3 to determine the target received power.

Figure 2:
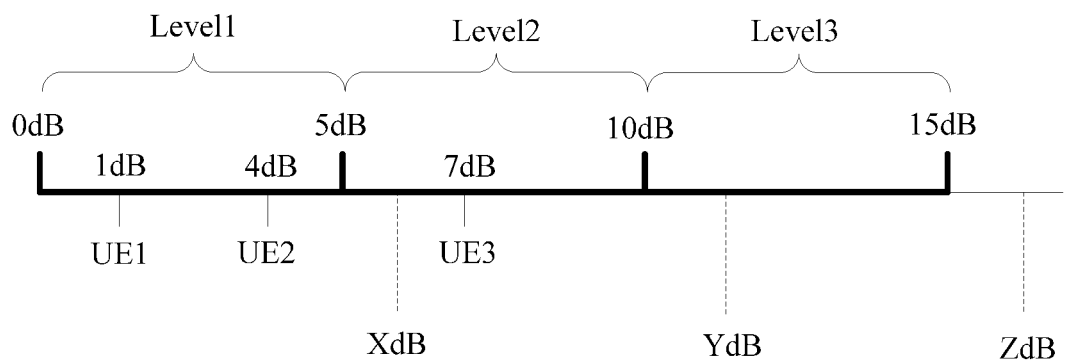
FIG. 2 is a schematic diagram of a power compensation value corresponding to a coverage enhancement level according to the present invention.

In the coverage enhancement scenario in this embodiment of the present invention, different coverage enhancement levels correspond to different coverage enhancement mechanisms, and terminals at a same coverage enhancement level use a same coverage enhancement mechanism. The terminal selects a proper coverage enhancement level and a corresponding coverage enhancement mechanism according to a coverage enhancement requirement of the terminal. For example, as shown in FIG. 2, using an example in which a maximum coverage enhancement requirement is 15 dB, both UE 1 and UE 2 are located in a range of a coverage enhancement level Level_1, the UE 1 needs to be compensated for a path loss of 1 dB, the UE2 needs to be compensated for a path loss of 4 dB, and UE 3 is located in a range of a coverage enhancement level Level_2 and needs to be compensated for a path loss of 7 dB. That is, if the UE 1, the UE 2, and the UE 3 all perform transmitting at the maximum transmit power $P_{MAX}$, in an ideal case, the UE 1, the UE 2, and the UE 3 need to be compensated by 1 dB, 4 dB, and 7 dB respectively to meet a receiving requirement of the network side. However, to ensure that terminals at a specific coverage enhancement level can be compensated effectively for a path loss, the compensation needs to be performed according to a maximum compensation requirement of this coverage enhancement level. For example, all terminals at Level_1 [0 dB, 5 dB) need to be compensated by 5 dB as a target, all terminals at Level_2 [5 dB, 10 dB) need to be compensated by 10 dB as a target, and all terminals at Level_3 [10 dB, 15 dB) need to be compensated by 15 dB as a target.

In this way, if the UE 1, the UE 2, and the UE 3 still transmit the signal at their respective maximum transmit powers, a signal received power obtained when the signal transmitted by the UEs arrives at the network side may be greater than a signal received power required by the network side, and a signal with a relatively great signal received power may overwhelm a signal with a relatively small signal received power, which affects normal receiving of the signal with a relatively small signal received power. Therefore, none of the UE 1, the UE 2, and the UE 3 needs to transmit the signal at their respective maximum transmit powers, and each UE has a remaining power available for power ramping. In order for terminals on hierarchical nodes (for example, 5 dB, 10 dB, and 15 dB) to reserve a power for power ramping, a compensation value of each coverage enhancement level needs to be greater than the maximum compensation requirement of this coverage enhancement level. Therefore, during determining of the transmit power, this embodiment of the present invention introduces a power compensation value (XdB, YdB, and ZdB in FIG. 2 are power compensation values corresponding to Level_1, Level_2, and Level_3 respectively) to avoid a signal overwhelming phenomenon caused when terminals at a same coverage enhancement level transmit a signal, and avoid a waste of power resources.

Further, the determining, by the transmit power determining module 12, the target received power in Formula 2 and Formula 3 includes: determining that a value of DELTA_PREAMBLE is 0.

Specifically, in the coverage enhancement scenario, because the transmit power determining module 12 determines the transmit power according to the power compensation value, the existing DELTA_PREAMBLE value table may be improved, as shown in Table 2:

TABLE 2

DELTA_PREAMBLE value table

| Random access preamble sequence format (Preamble Format) | DELTA_PREAMBLE value (DELTA_PREAMBLE value) |
|---|---|
| 0 | 0 dB |
| 1 | 0 dB |

TABLE 2-continued

DELTA_PREAMBLE value table

| Random access preamble sequence format (Preamble Format) | DELTA_PREAMBLE value (DELTA_PREAMBLE value) |
|---|---|
| 2 | −3 dB/0 dB* |
| 3 | −3 dB/0 dB* |
| 4 | 8 dB |

In Table 2, * denotes that the value is pertinent to the coverage enhancement scenario.

If the transmit power used by the terminal to transmit the signal in the coverage enhancement scenario is calculated according to the DELTA_PREAMBLE value table in the prior art, 3 dB needs to be subtracted in calculating the transmit power according to format 2 and format 3. Then, in the coverage enhancement scenario, more signal repetition is required to compensate for the subtracted 3 dB, which leads to a waste of resources. Therefore, in this embodiment of the present invention, the DELTA_PREAMBLE value table in the coverage enhancement scenario is improved, and the DELTA_PREAMBLE values in format 2 and format 3 are set to 0 to avoid a waste of resources. However, it should be noted that if the DELTA_PREAMBLE value is 0, for a same power compensation value $G_{Ri}$, quantities of times required for signals (such as a preamble) of different formats to be transmitted should be different. That is, a quantity of repetition times Ri required for a same power compensation value $G_{Ri}$ varies for signals of different formats.

Quantities of signal sequences included in different preamble formats are different. For example, format 0 and format 1 each include one signal sequence, and format 2 and format 3 each include two signal sequences. Therefore, if a total of required repetition times is 10, the preambles of format 0 and format 1 are used, and each preamble needs to be transmitted repeatedly for 10 times; if the preambles of format 2 and format 3 are used, each preamble needs to be transmitted repeatedly for only 5 times.

Based on the foregoing embodiment, the determining, by transmit power determining module 12, the quantity of signal transmitting attempts at the coverage enhancement level currently used by the terminal in Formula 2 and Formula 3 includes:

(i) when the configuration information carries a maximum quantity of signal transmitting attempts corresponding to each coverage enhancement level, determining, from the configuration information, a maximum quantity of signal transmitting attempts at the coverage enhancement level currently used by the terminal.

For example, assuming that the configuration information carries the maximum quantity of signal transmitting attempts corresponding to each coverage enhancement level, for example, a maximum quantity of attempts corresponding to Level_1 (coverage enhancement level 1) is 2, a maximum quantity of attempts corresponding to Level_2 is 2, and a maximum quantity of attempts corresponding to Level_3 is 1, if the coverage enhancement level currently used by the terminal is Level_2, the transmit power determining module 12 determines that the quantity of signal transmitting attempts made by the terminal is 2.

In implementation, the maximum quantities of signal transmitting attempts corresponding to all the coverage enhancement levels may be the same or different. Preferably, if the maximum quantities of signal transmitting attempts corresponding to all the coverage enhancement levels are the same, the configuration information needs to carry only one value of a maximum quantity of attempts.

(ii) when the configuration information carries a total of maximum quantities of signal transmitting attempts corresponding to all the coverage enhancement levels (that is, PREAMBLE_TRANSMISSION_COUNTER_CI_total), determining, according to the total of quantities of attempts carried in the configuration information, a maximum quantity of signal transmitting attempts made by the terminal at each coverage enhancement level, and determining, according to the coverage enhancement level currently used by the terminal, a maximum quantity of signal transmitting attempts at the coverage enhancement level currently used by the terminal.

The transmit power determining module 12 may determine by itself the maximum quantity of signal transmitting attempts at each coverage enhancement level, or according to an agreed rule, determine the maximum quantity of signal transmitting attempts at each coverage enhancement level.

For example, assuming that the configuration information carries a total of maximum quantities of signal transmitting attempts corresponding to all the coverage enhancement levels, for example, if the maximum quantity of signal transmitting attempts made by the terminal at all levels is 6, the transmit power determining module 12 may first determine, according to a specified algorithm, the maximum quantity of attempts made by the terminal at each coverage enhancement level (for example, may determine that a maximum quantity of attempts at Level_1 is 4, a maximum quantity of attempts at Level_2 is 2, and no attempt is made at Level_3; for another example, may determine that 2 attempts are made at each level), and then the transmit power determining module 12 determines, according to the coverage enhancement level currently used by the terminal, the maximum quantity of signal transmitting attempts at the coverage enhancement level currently used by the terminal.

It should be noted that PREAMBLE_TRANSMISSION_COUNTER_CI (that is, the quantity of signal transmitting attempts at the coverage enhancement level currently used by the terminal) in Formula 2 and Formula 3 is not greater than the determined maximum quantity of signal transmitting attempts at the coverage enhancement level currently used by the terminal. That is, the value of PREAMBLE_TRANSMISSION_COUNTER_CI may start from 1, and increase to the maximum quantity of signal transmitting attempts at the coverage enhancement level currently used by the terminal.

In addition, the present invention does not limit the use of the maximum quantity of attempts of the terminal, and any of the following manners may be used:

(i) After power ramping is performed according to the maximum quantity of attempts corresponding to the coverage enhancement level currently used by the terminal, if it is determined that the network side receives no signal transmitted by the terminal (for example, in a random access process, network access is not successful), the terminal is switched to a higher coverage enhancement level to continue attempting.

(ii) After power ramping is performed according to a quantity of attempts less than the maximum quantity of attempts corresponding to the coverage enhancement level currently used by the terminal, if it is determined that the network side receives no signal transmitted by the terminal (for example, in a random access process, network access is not successful), the terminal is switched to a higher coverage enhancement level to continue attempting.

(iii) Assuming that the maximum quantity of attempts corresponding to the coverage enhancement level currently used by the terminal is N, after x attempts of power ramping are made, if it is determined that the network side receives no signal transmitted by the terminal (for example, in a random access process, network access is not successful) and the transmit power determined in this case already reaches the maximum transmit power of the terminal, y more attempts are made to transmit the signal at the maximum transmit power, where $x+y<=N$.

Based on any of the foregoing embodiments, the determining, by transmit power determining module 12, the power ramping step in each signal transmitting attempt at the coverage enhancement level currently used by the terminal in Formula 2 and Formula 3 includes:

(i) when the configuration information carries a power ramping step in each signal transmitting attempt corresponding to each coverage enhancement level, determining, from the configuration information, the power ramping step in each signal transmitting attempt at the coverage enhancement level currently used by the terminal.

Specifically, the power ramping step in each signal transmitting attempt corresponding to each coverage enhancement level refers to: for each coverage enhancement level, a power ramping step between the power used in an $i^{th}$ repetition in each signal transmitting attempt and the power used in an $i^{th}$ repetition in a previous signal transmitting attempt, where $i=1, \ldots, N$, and N is the quantity of repetition times that is required for the signal to be transmitted and corresponding to each coverage enhancement level. Therefore, the transmit power determining module 12 determines that, the power ramping step between the power used for transmitting the signal repeatedly for the $i^{th}$ time in any signal transmitting attempt corresponding to the coverage enhancement level currently used by the terminal and the power used for transmitting the signal repeatedly for the $i^{th}$ time in a previous signal transmitting attempt, is the power ramping step (powerRampingStep_CI) in each signal transmitting attempt at the coverage enhancement level currently used by the terminal.

Power ramping steps between any two times that the signal is transmitted repeatedly in any attempt corresponding to each coverage enhancement level may be the same or different.

(ii) when the configuration information carries a total of power ramping steps (powerRampingStep_CI_total) after the signal is transmitted repeatedly for N times in each attempt corresponding to each coverage enhancement level, determining, from the configuration information, a total of power ramping steps after the signal is transmitted repeatedly for N times in each attempt corresponding to the coverage enhancement level currently used by the terminal; and according to the determined total of power ramping steps, determining the power ramping step in each signal transmitting attempt at the coverage enhancement level currently used by the terminal.

Specifically, the total of power ramping steps after the signal is transmitted repeatedly for N times in each attempt corresponding to each coverage enhancement level refers to: for each coverage enhancement level, a power ramping step between the power used after the signal is transmitted repeatedly for N times in each attempt and the power used after the signal is transmitted repeatedly for N times in a previous attempt, where N is the quantity of repetition times that is required for the signal to be transmitted and corresponding to each coverage enhancement level.

The determined power ramping step in each signal transmitting attempt at the coverage enhancement level currently used by the terminal refers to: at the coverage enhancement level currently used by the terminal, a power ramping step between the power used in the $i^{th}$ repetition in each signal transmitting attempt and the power used in the $i^{th}$ repetition in a previous signal transmitting attempt, where $i=1, \ldots, N^*$, and $N^*$ is the quantity of repetition times that is required for the signal to be transmitted and corresponding to the coverage enhancement level currently used by the terminal.

The terminal may determine by itself the power ramping step in each signal transmitting attempt at each coverage enhancement level, or may determine the power ramping step in each signal transmitting attempt at each coverage enhancement level according to an agreed rule.

Based on any of the foregoing embodiments, after the terminal switches the currently used coverage enhancement level, the transmit power determining module 12 is further configured to:

according to the power compensation value corresponding to the coverage enhancement level used by the terminal before the switching and a power compensation value corresponding to a coverage enhancement level used after the switching, determine a transmit power used for transmitting the signal at the coverage enhancement level used after the switching, where the coverage enhancement level used by the terminal after the switching is higher than the coverage enhancement level used by the terminal before the switching.

Further, the transmit power determining module 12 is specifically configured to:

when the currently determined transmit power is the maximum transmit power of the terminal, if it is determined that the network side receives no signal transmitted by the terminal (for example, in a random access process, network access is not successful), switch the coverage enhancement level used by the terminal.

Specifically, if the terminal currently transmits the signal at the maximum transmit power of the terminal but the network side still does not successfully receive the signal transmitted by the terminal, the transmit power determining module 12 switches the coverage enhancement level used by the terminal to a higher coverage enhancement level.

In implementation, in an optional implementation manner, the transmit power determining module 12 determines, according to the following Formula 4, the transmit power used for transmitting the signal at the coverage enhancement level used after the switching:

$$\begin{cases} P_i \geq P_{i-1} + G_{Ri-1} - G_{Ri}, & (P_{i-1} + G_{Ri-1} - G_{Ri}) < P_{MAX} \\ P_i = P_{MAX}, & (P_{i-1} + G_{Ri-1} - G_{Ri}) \geq P_{MAX} \end{cases}$$ Formula 4 where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, and $G_{Ri-1}$ is the power compensation value corresponding to the coverage enhancement level of the terminal before the switching.

For a terminal that switches from a lower coverage enhancement level to a higher coverage enhancement level, during determining of the transmit power used for transmitting the signal, it needs to be ensured that the received power of the signal arriving at the network side (such as a base station) should be not less than (that is, should be greater than or equal to) the received power used before the switching. Otherwise, the switching of the coverage enhancement level makes no sense. For example, assuming that the coverage enhancement level used before the switching is Leve_i−1, the transmit power is P_i−1, the received power of the signal arriving at the network side is Pr_i−1, the coverage enhancement level used after the switching is Leve_i, and the determined transmit power is P_i, it needs to be ensured that the received power of the signal arriving at the network side is Pr_i≥Pr_i−1. In this embodiment of the present invention, Formula 4 is used to calculate the transmit power used by the terminal for transmitting the signal at the coverage enhancement level used after the switching, thereby ensuring Pr_i≥Pr_i−1.

In another optional implementation manner, the transmit power determining module 12 determines, according to Formula 5 as follows, the transmit power used for transmitting the signal at the coverage enhancement level used after the switching:

$$\begin{cases} P_i \geq P_{i-1} + G_{Ri-1} - G_{Ri} + & (P_{i-1} + G_{Ri-1} - G_{Ri} + \\ \text{powerRampingStep\_CI\_i}, & \text{powerRampingStep\_CI\_i}) < \\ & P_{MAX} \\ P_i = P_{MAX}, & (P_{i-1} + G_{Ri-1} - G_{Ri} + \\ & \text{powerRampingStep\_CI\_i}) \geq \\ & P_{MAX} \end{cases}$$ Formula 5 where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, $G_{Ri-1}$ is the power compensation value corresponding to the coverage enhancement level of the terminal before the switching, and powerRampingStep_CI_i is a power ramping step of the terminal in each signal transmitting attempt at the coverage enhancement level used after the switching.

A method for determining powerRampingStep_CI_i in Formula 5 described above is the same as the method for determining the power ramping step in each signal transmitting attempt at the coverage enhancement level currently used by the terminal in Formula 2 and Formula 3, and details are not described herein.

Further, the transmit power, which is used by the terminal for transmitting the signal at the coverage enhancement level used after the switching, is determined, and power ramping may be performed on the basis of $P_i$ until the maximum transmit power is reached. That is, the transmit power determining module 12 determines, according to Formula 6 as follows, the transmit power used for transmitting the signal at the coverage enhancement level used after the switching, until a currently determined transmit power reaches the maximum transmit power of the terminal:

$$P'=P_i+(\text{PREAMBLE\_TRANSMISSION\_COUNTER}\_i-1)*\text{powerRampingStep\_CI\_i}$$ Formula 6, where P' is the current transmit power determined by the terminal for transmitting the signal, and PREAMBLE_TRANSMISSION_COUNTER_CI_i is a maximum quantity of signal transmitting attempts made by the terminal at the coverage enhancement level used after the switching.

A method for determining PREAMBLE_TRANSMISSION_COUNTER_CI_i in Formula 6 described above is the same as the method for determining the quantity of signal transmitting attempts at the coverage enhancement level currently used by the terminal in Formula 2 and Formula 3, and details are not described herein.

Based on the foregoing embodiment, the value of PREAMBLE_TRANSMISSION_COUNTER_CI_i may fall within $[1, \ldots, N_i]$, and $N_i$ is the maximum quantity of signal transmitting attempts made by the terminal at the coverage enhancement level used after the switching. That is, when the terminal changes the coverage enhancement level, the value of PREAMBLE_TRANSMISSION_COUNTER_CI_i returns to 1, which means that each coverage enhancement level increases from 1.

Based on the foregoing embodiment, alternatively, the value of PREAMBLE_TRANSMISSION_COUNTER_CI_i may fall within $[N'+1, \ldots, N'+N_i]$, N' is a total of maximum quantities of signal transmitting attempts made by the terminal before switching the coverage enhancement level, and $N_i$ is a maximum quantity of signal transmitting attempts made by the terminal at the coverage enhancement level used after the switching. That is, when the terminal changes the coverage enhancement level, the value of PREAMBLE_TRANSMISSION_COUNTER_CI_i does not return to 1, and the maximum quantities of attempts of all the coverage enhancement levels increase together.

Based on any of the foregoing embodiments, in this embodiment of the present invention, each attempt made by the terminal to transmit a signal includes transmitting the signal repeatedly for N times, where N is the quantity of repetition times that is required for the signal to be transmitted and corresponding to the coverage enhancement level currently used by the terminal.

For example, assuming that the coverage enhancement level of the terminal is Level_2 and the quantity of repetition times required for the signal to be transmitted at Level_2 is 4, each attempt made by the terminal to transmit the signal includes transmitting the signal repeatedly for 4 times.

In the foregoing embodiment, the transmit power determining module 12 is further configured to:

when the power compensation value cannot be obtained according to the configuration information, determine that the transmit power used by the terminal for transmitting the signal is the maximum transmit power of the terminal.

Specifically, no information related to the power compensation value is configured in the configuration information obtained by the configuration information obtaining module 11. For example, no power compensation value corresponding to each coverage enhancement level is configured in the configuration information. For another example, no quantity of repetition times that is required for the signal to be transmitted and corresponding to each coverage enhancement level is configured in the configuration information. For still another example, no correspondence between a quantity of repetition times and a power compensation value is configured in the configuration information.

With reference a preferred hardware structure, the following describes a structure and a processing manner of a terminal provided in an embodiment of the present invention.

Figure 3:
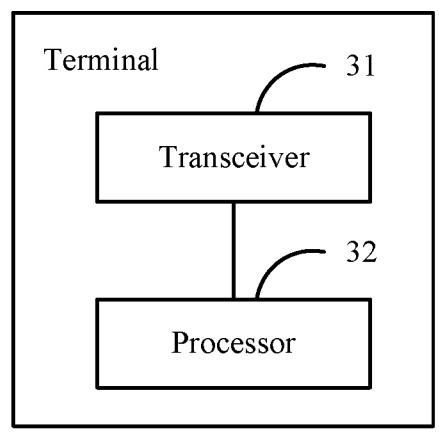
FIG. 3 is a schematic diagram of another terminal according to the present invention.

Referring to FIG. 3, the terminal includes a transceiver 31, and at least one processor 32 connected to the transceiver 31.

The processor 32 is configured to obtain configuration information that is used to determine a transmit power used for transmitting a signal at each coverage enhancement level; and according to the obtained configuration information, determine a transmit power used for transmitting the signal at a coverage enhancement level currently used by the terminal.

In implementation, the configuration information may be agreed between the terminal and a network side, or may be configured by a network side and then transmitted to the terminal. This embodiment of the present invention does not limit a method for obtaining the configuration information. If the configuration information is configured by the network side, the transceiver 31 is configured to receive the configuration information transmitted by the network side.

Based on any of the foregoing embodiments, in a first implementation manner, if the obtained configuration information includes a quantity of repetition times required for the signal to be transmitted at each coverage enhancement level, the processor 32 is specifically configured to:

according to the quantity of repetition times included in the configuration information, determine a quantity of repetition times required for the signal to be transmitted at the coverage enhancement level currently used by the terminal; and according to the determined quantity of repetition times, determine the transmit power used for transmitting the signal at the coverage enhancement level currently used by the terminal.

Further, in a preferred implementation manner, the processor 32 is specifically configured to:

according to a correspondence between a quantity of repetition times and a power compensation value, determine a power compensation value corresponding to the quantity of repetition times required for the signal to be transmitted at the coverage enhancement level currently used by the terminal; and according to the determined power compensation value, determine the transmit power used for transmitting the signal at the coverage enhancement level currently used by the terminal.

Except the foregoing preferred implementation manner, alternatively, the processor 32 may determine, according to the following step, the transmit power used for transmitting the signal at the coverage enhancement level currently used by the terminal:

determining, according to a correspondence between a quantity of repetition times and a transmit power, a transmit power corresponding to the quantity of repetition times required for the signal to be transmitted at the coverage enhancement level currently used by the terminal.

Based on any of the foregoing embodiments, in a second implementation manner, if the obtained configuration information includes the power compensation value corresponding to each coverage enhancement level, the processor 32 is specifically configured to:

according to the power compensation values included in the configuration information, determine a power compensation value corresponding to the coverage enhancement level currently used by the terminal; and according to the determined power compensation value, determine the transmit power used for transmitting the signal at the coverage enhancement level currently used by the terminal.

Based on the foregoing embodiment, preferably, during configuration of the power compensation value $G_{Ri}$, different coverage enhancement levels correspond to different power compensation values $G_{Ri}$, and a higher coverage enhancement level corresponds to a greater power compensation value $G_{Ri}$. Certainly, during configuration of the power compensation value $G_{Ri}$, different coverage enhancement levels may correspond to a same power compensation value $G_{Ri}$; or some coverage enhancement levels may correspond to a same power compensation value $G_{Ri}$ while some coverage enhancement levels may correspond to different power compensation values $G_{Ri}$.

By using a random access process of a terminal as an example (that is, a signal transmitted by the terminal is a random access preamble sequence), the following describes a process for determining a transmit power used by the terminal for transmitting the signal.

In implementation, the processor 32 determines, according to the determined power compensation value and according to Formula 1 as follows, the transmit power used for transmitting the signal at the coverage enhancement level currently used by the terminal:

$$P=\min\{P_{MAX}, \text{PREAMBLE\_RECEIVED\_TARGET\_POWER\_CI} + PL\} \quad \text{Formula 1,}$$

where P is the transmit power of transmitting the signal by the terminal, $P_{MAX}$ is a maximum transmit power of the terminal, PREAMBLE_RECEIVED_TARGET_POWER_CI s a target received power determined according to the power compensation value corresponding to the coverage enhancement level currently used by the terminal, and PL is a path loss.

Further, the processor 32 determines the target received power PREAMBLE_RECEIVED_TARGET_POWER_CI according to Formula 2 or Formula 3 as follows:

$$\text{PREAMBLE\_RECEIVED\_TARGET\_POWER\_CI} = \text{preambleInitialReceivedTargerPower} + \text{DELTA\_PREAMBLE\_}G_{Ri} \quad \text{Formula 2; or}$$

$$\text{PREAMBLE\_RECEIVED\_TARGET\_POWER\_CI} = \text{preambleInitialReceivedTargerPower} + \text{DELTA\_PREAMBLE\_}G_{Ri} + (\text{PREAMBLE\_TRANSMISSION\_COUNTER\_CI} - 1)^* \text{powerRampingStep\_CI} \quad \text{Formula 3.}$$

In Formula 2 and Formula 3 described above, $G_{Ri}$ is the power compensation value, preambleInitialReceivedTargetPower is an initial target received power, DELTA_PREAMBLE is an offset corresponding to a format of the signal transmitted by the terminal, PREAMBLE_TRANSMISSION_COUNTER_CI is a quantity of signal transmitting attempts at the coverage enhancement level currently used by the terminal, and powerRampingStep_CI is a power ramping step in each signal transmitting attempt at the coverage enhancement level currently used by the terminal.

Specifically, if power ramping is not considered, the processor 32 uses Formula 2 to determine the target received power; if power ramping is considered, the processor 32 uses Formula 3 to determine the target received power.

Further, the determining, by the processor 32, the target received power in Formula 2 and Formula 3 includes: determining that a value of DELTA_PREAMBLE is 0.

Based on the foregoing embodiment, the processor 32 determines the quantity of signal transmitting attempts at the coverage enhancement level currently used by the terminal in Formula 2 and Formula 3, including:

(i) when the configuration information carries a maximum quantity of signal transmitting attempts corresponding to each coverage enhancement level, determining, from the configuration information, a maximum quantity of signal transmitting attempts made by the terminal at the coverage enhancement level currently used by the terminal.

In implementation, the maximum quantities of signal transmitting attempts corresponding to all the coverage enhancement levels may be the same or different. Preferably, if the maximum quantities of signal transmitting attempts corresponding to all the coverage enhancement levels are the same, the configuration information needs to carry only one value of a maximum quantity of attempts.

(ii) when the configuration information carries a total of maximum quantities of signal transmitting attempts corresponding to all the coverage enhancement levels, determining, according to the total of quantities of attempts carried in the configuration information, a maximum quantity of signal transmitting attempts made by the terminal at each coverage enhancement level, and determining, according to the coverage enhancement level currently used by the terminal, a maximum quantity of signal transmitting attempts at the coverage enhancement level currently used by the terminal.

The processor 32 may determine by itself the maximum quantity of signal transmitting attempts at each coverage enhancement level, or may determine the maximum quantity of signal transmitting attempts at each coverage enhancement level according to an agreed rule.

It should be noted that PREAMBLE_TRANSMISSION_COUNTER_CI (that is, the quantity of signal transmitting attempts at the coverage enhancement level currently used by the terminal) in Formula 2 and Formula 3 is not greater than the determined maximum quantity of signal transmitting attempts at the coverage enhancement level currently used by the terminal. That is, the value of PREAMBLE_TRANSMISSION_COUNTER_CI may start from 1, and increase to the maximum quantity of signal transmitting attempts at the coverage enhancement level currently used by the terminal.

In addition, the present invention does not limit the use of the maximum quantity of attempts of the terminal.

Based on any of the foregoing embodiments, the determining, by the processor 32, the power ramping step in each signal transmitting attempt at the coverage enhancement level currently used by the terminal in Formula 2 and Formula 3 includes:

(i) when the configuration information carries a power ramping step in each signal transmitting attempt corresponding to each coverage enhancement level, determining, from the configuration information, the power ramping step in each signal transmitting attempt at the coverage enhancement level currently used by the terminal.

Specifically, the power ramping step in each signal transmitting attempt corresponding to each coverage enhancement level refers to: for each coverage enhancement level, a power ramping step between the power used in an $i^{th}$ repetition in each signal transmitting attempt and the power used in an $i^{th}$ repetition in a previous signal transmitting attempt, where i=1, . . . , N, and N is the quantity of repetition times that is required for the signal to be transmitted and corresponding to each coverage enhancement level. Therefore, the processor 32 determines that, the power ramping step between the power used for transmitting the signal repeatedly for the $i^{th}$ time in any signal transmitting attempt corresponding to the coverage enhancement level currently used by the terminal and the power used for transmitting the signal repeatedly for the $i^{th}$ time in a previous signal transmitting attempt, is the power ramping step (powerRampingStep_CI) in each signal transmitting attempt at the coverage enhancement level currently used by the terminal.

Power ramping steps between any two times that the signal is transmitted repeatedly in any attempt corresponding to each coverage enhancement level may be the same or different.

(ii) when the configuration information carries a total of power ramping steps (powerRampingStep_CI_total) after the signal is transmitted repeatedly for N times in each attempt corresponding to each coverage enhancement level, determining, from the configuration information, a total of power ramping steps after the signal is transmitted repeatedly for N times in each attempt corresponding to the coverage enhancement level currently used by the terminal; and according to the determined total of power ramping steps, determining the power ramping step in each signal transmitting attempt at the coverage enhancement level currently used by the terminal.

Specifically, the total of power ramping steps after the signal is transmitted repeatedly for N times in each attempt corresponding to each coverage enhancement level refers to: for each coverage enhancement level, a power ramping step between the power used after the signal is transmitted repeatedly for N times in each attempt and the power used after the signal is transmitted repeatedly for N times in a previous attempt, where N is the quantity of repetition times that is required for the signal to be transmitted and corresponding to each coverage enhancement level.

The determined power ramping step in each signal transmitting attempt at the coverage enhancement level currently used by the terminal refers to: at the coverage enhancement level currently used by the terminal, a power ramping step between the power used in the $i^{th}$ repetition in each signal transmitting attempt and the power used in the $i^{th}$ repetition in a previous signal transmitting attempt, where i=1, . . . , N*, and N* is the quantity of repetition times that is required for the signal to be transmitted and corresponding to the coverage enhancement level currently used by the terminal.

The processor 32 may determine by itself the power ramping step in each signal transmitting attempt at each coverage enhancement level, or may determine the power ramping step in each signal transmitting attempt at each coverage enhancement level according to an agreed rule.

Based on any of the foregoing embodiments, after the terminal switches the currently used coverage enhancement level, the processor 32 is further configured to:

according to the power compensation value corresponding to the coverage enhancement level used by the terminal before the switching and a power compensation value corresponding to a coverage enhancement level used after the switching, determine a transmit power used for transmitting the signal at the coverage enhancement level used after the switching, where the coverage enhancement level used by the terminal after the switching is higher than the coverage enhancement level used by the terminal before the switching.

Further, the processor 32 is specifically configured to:
when the currently determined transmit power is the maximum transmit power of the terminal, if it is determined that the network side receives no signal transmitted by the terminal (for example, in a random access process, network access is not successful), switch the coverage enhancement level used by the terminal.

In implementation, in an optional implementation manner, the processor 32 determines, according to Formula 4 as follows, the transmit power used for transmitting the signal at the coverage enhancement level used after the switching:

$$\begin{cases} P_i \geq P_{i-1} + G_{Ri-1} - G_{Ri}, & (P_{i-1} + G_{Ri-1} - G_{Ri}) < P_{MAX} \\ P_i = P_{MAX}, & (P_{i-1} + G_{Ri-1} - G_{Ri}) \geq P_{MAX} \end{cases} \quad \text{Formula 4}$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, and $G_{Ri-1}$ is the power compensation value corresponding to the coverage enhancement level of the terminal before the switching.

In another optional implementation manner, the processor 32 determines, according to Formula 5 as follows, the transmit power used for transmitting the signal at the coverage enhancement level used after the switching:

$$\begin{cases} P_i \geq P_{i-1} + G_{Ri-1} - G_{Ri} + & (P_{i-1} + G_{Ri-1} - G_{Ri} + \\ \text{powerRampingStep\_CI\_i}, & \text{powerRampingStep\_CI\_i}) < \\ & P_{MAX} \\ P_i = P_{MAX}, & (P_{i-1} + G_{Ri-1} - G_{Ri} + \\ & \text{powerRampingStep\_CI\_i}) \geq \\ & P_{MAX} \end{cases} \quad \text{Formula 5}$$

where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, $G_{Ri-1}$ is the power compensation value corresponding to the coverage enhancement level of the terminal before the switching, and powerRampingStep_CI_i is a power ramping step of the terminal in each signal transmitting attempt at the coverage enhancement level used after the switching.

A method for determining powerRampingStep_CI_i in Formula 5 described above is the same as the method for determining the power ramping step in each signal transmitting attempt at the coverage enhancement level currently used by the terminal in Formula 2 and Formula 3, and details are not described herein.

Further, the processor 32 determines, according to Formula 6 as follows, the transmit power used for transmitting the signal at the coverage enhancement level used after the switching, until a currently determined transmit power reaches the maximum transmit power of the terminal:

$$P'=P_i+(\text{PREAMBLE\_TRANSMISSION\_COUNTER\_CI\_i}-1)*\text{powerRampingStep\_CI\_i} \quad \text{Formula 6,}$$

where P' is the current transmit power determined by the terminal for transmitting the signal, and PREAMBLE_TRANSMISSION_COUNTER_CI_i is a maximum quantity of signal transmitting attempts made by the terminal at the coverage enhancement level used after the switching.

A method for determining PREAMBLE_TRANSMISSION_COUNTER_CI_i in Formula 6 described above is the same as the method for determining the quantity of signal transmitting attempts at the coverage enhancement level currently used by the terminal in Formula 2 and Formula 3, and details are not described herein.

Based on the foregoing embodiment, the value of PREAMBLE_TRANSMISSION_COUNTER_CI_i may fall within [1, . . . , $N_i$], and $N_i$ is the maximum quantity of signal transmitting attempts made by the terminal at the coverage enhancement level used after the switching. That is, when the terminal changes the coverage enhancement level, the value of PREAMBLE_TRANSMISSION_COUNTER_CI_i returns to 1, which means that each coverage enhancement level increases from 1.

Based on the foregoing embodiment, alternatively, the value of PREAMBLE_TRANSMISSION_COUNTER_CI_i may fall within [N'+1, ..., N'+N$_i$], N' is a total of maximum quantities of signal transmitting attempts made by the terminal before switching the coverage enhancement level, and N$_i$ is a maximum quantity of signal transmitting attempts made by the terminal at the coverage enhancement level used after the switching. That is, when the terminal changes the coverage enhancement level, the value of PREAMBLE_TRANSMISSION_COUNTER_CI_i does not return to 1, and the maximum quantities of attempts of all the coverage enhancement levels increase together.

Based on any of the foregoing embodiments, in this embodiment of the present invention, each attempt made by the terminal to transmit a signal includes transmitting the signal repeatedly for N times, where N is the quantity of repetition times that is required for the signal to be transmitted and corresponding to the coverage enhancement level currently used by the terminal.

Figure 4:
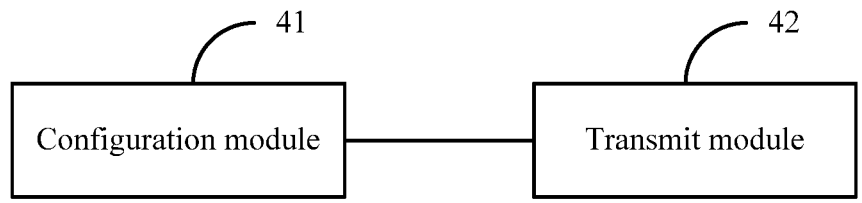
FIG. 4 is a schematic diagram of a network-side device according to the present invention.

Based on the same invention conception, the present invention provides a network-side device. As shown in FIG. 4, the network-side device includes:

a configuration module 41, configured to obtain configuration information that is used to determine a transmit power used for transmitting a signal at each coverage enhancement level; and a transmit module 42, configured to transmit the configuration information to a terminal served by the network-side device, so that the terminal determines, according to the configuration information, a transmit power used for transmitting the signal at a coverage enhancement level currently used by the terminal.

In implementation, the network-side device may be a base station, a relay (Relay), a mobility management entity MME (Mobility Management Entity), or the like.

In implementation, the transmit module 42 may transmit, in a broadcast manner, the configuration information to the terminal served by the network-side device.

In this embodiment of the present invention, the configuration information includes at least one of the following information:

a power compensation value corresponding to each coverage enhancement level;

a quantity of repetition times required for the signal to be transmitted at each coverage enhancement level;

a maximum quantity of signal transmitting attempts at each coverage enhancement level;

a total of maximum quantities of signal transmitting attempts at all the coverage enhancement levels;

a power ramping step in each signal transmitting attempt corresponding to each coverage enhancement level; or a total of power ramping steps after the signal is transmitted repeatedly for N times in each attempt corresponding to each coverage enhancement level.

With reference a preferred hardware structure, the following uses a base station as an example to describe a structure and a processing manner of a network-side device provided in an embodiment of the present invention.

Figure 5:
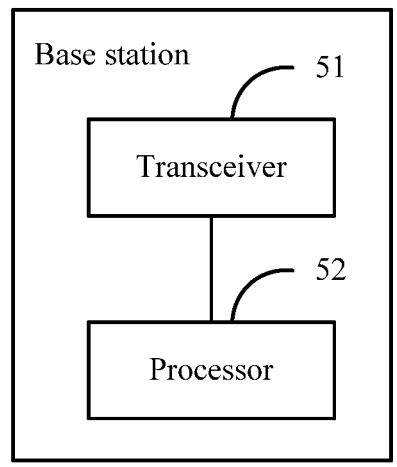
FIG. 5 is a schematic diagram of another network-side device according to the present invention.

Referring to FIG. 5, a base station includes a transceiver 51, and at least one processor 52 connected to the transceiver 51.

The processor 52 is configured to configure related configuration information that is used to determine a transmit power used for transmitting a signal at each coverage enhancement level.

The transceiver 51 is configured to transmit the configuration information to a terminal served by the network-side device, so that the terminal determines, according to the configuration information, a transmit power used for transmitting the signal at a coverage enhancement level currently used by the terminal.

In implementation, the transceiver 51 may transmit, in a broadcast manner, the configuration information to the terminal served by the network-side device.

In this embodiment of the present invention, the configuration information includes at least one of the following information:

a power compensation value corresponding to each coverage enhancement level;

a quantity of repetition times required for the signal to be transmitted at each coverage enhancement level;

a maximum quantity of signal transmitting attempts at each coverage enhancement level;

a total of maximum quantities of signal transmitting attempts at all the coverage enhancement levels;

a power ramping step in each signal transmitting attempt corresponding to each coverage enhancement level; or a total of power ramping steps after the signal is transmitted repeatedly for N times in each attempt corresponding to each coverage enhancement level.

Figure 6:
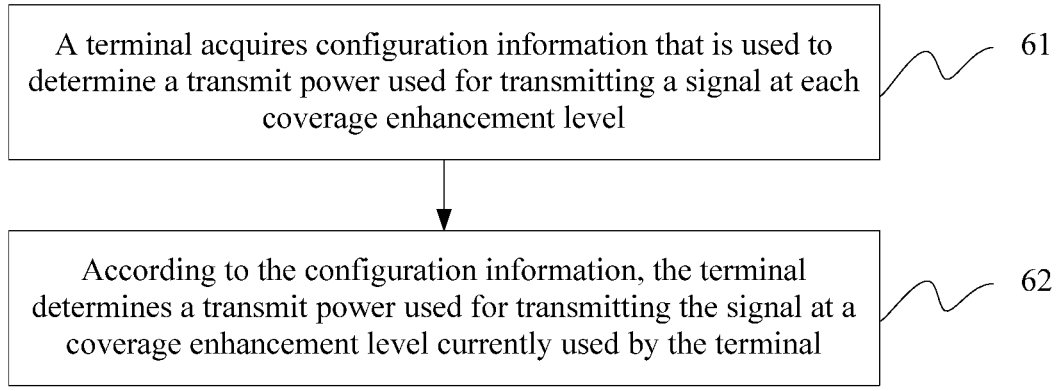
FIG. 6 is a schematic diagram of a method for determining a transmit power in a coverage enhancement scenario according to the present invention.

Based on the same invention conception, an embodiment of the present invention further provides a method for determining, by a terminal side, a transmit power in a coverage enhancement scenario. Referring to FIG. 6, the method includes:

Step 61: A terminal obtains configuration information that is used to determine a transmit power used for transmitting a signal at each coverage enhancement level.

Step 62: According to the configuration information, the terminal determines a transmit power used for transmitting the signal at a coverage enhancement level currently used by the terminal.

In implementation, the configuration information is agreed between the terminal and a network side, or the configuration information is configured by a network side and sent to the terminal.

Based on any of the foregoing embodiments, in a first implementation manner, if the configuration information includes a quantity of repetition times required for the signal to be transmitted at each coverage enhancement level, the determining, by the terminal, according to the configuration information, a transmit power used for transmitting the signal at a coverage enhancement level currently used by the terminal in step 62 includes:

determining, by the terminal according to the quantity of repetition times included in the configuration information, a quantity of repetition times required for the signal to be transmitted at the coverage enhancement level currently used by the terminal; and determining, by the terminal according to the determined quantity of repetition times, the transmit power used for transmitting the signal at the coverage enhancement level currently used by the terminal.

Further, in a preferred implementation manner, the determining, by the terminal according to the configuration information, a transmit power used for transmitting the signal at a coverage enhancement level currently used by the terminal in step 62 includes:

determining, by the terminal according to a correspondence between a quantity of repetition times and a power compensation value, a power compensation value corresponding to the quantity of repetition times required for the signal to be transmitted at the coverage enhancement level currently used by the terminal; and determining, by the terminal according to the determined power compensation value, the transmit power used for transmitting the signal at the coverage enhancement level currently used by the terminal.

Based on any of the foregoing embodiments, in a second implementation manner, if the configuration information includes the power compensation value corresponding to each coverage enhancement level, the determining, by the terminal, according to the configuration information, a transmit power used for transmitting the signal at a coverage enhancement level currently used by the terminal in step 62 includes:

determining, by the terminal according to the power compensation values included in the configuration information, a power compensation value corresponding to the coverage enhancement level currently used by the terminal; and determining, by the terminal according to the determined power compensation value, the transmit power used for transmitting the signal at the coverage enhancement level currently used by the terminal.

Based on any of the foregoing embodiments, the terminal determines, according to the following formula, the transmit power used for transmitting the signal at the coverage enhancement level currently used by the terminal:

$$P=\min\{P_{MAX}, \text{PREAMBLE\_RECEIVED\_TARGET\_POWER\_}CI+PL\} \quad \text{Formula 1,}$$

where P is the transmit power of transmitting the signal by the terminal, $P_{MAX}$ is a maximum transmit power of the terminal, PREAMBLE_RECEIVED_TARGET_POWER_CI is a target received power determined by the terminal according to the power compensation value corresponding to the coverage enhancement level currently used by the terminal, and PL is a path loss.

Further, the terminal determines the target received power according to the following formula:

$$\text{PREAMBLE\_RECEIVED\_TARGET\_POWER\_}CI = \text{preambleInitialReceivedTargetPower+DELTA\_PREAMBLE\_}G_{Ri} \quad \text{Formula 2; or}$$

$$\text{PREAMBLE\_RECEIVED\_TARGET\_POWER\_}CI = \text{preambleInitialReceivedTargetPower+DELTA\_PREAMBLE\_}G_{Ri}+(\text{PREAMBLE\_TRANSMISSION\_COUNTER\_}CI-1)*\text{powerRampingStep\_}CI \quad \text{Formula 3,}$$

where $G_{Ri}$ is the power compensation value, preambleInitialReceivedTargetPower is an initial target received power, DELTA_PREAMBLE is an offset corresponding to a format of the signal transmitted by the terminal, PREAMBLE_TRANSMISSION_COUNTER_CI is a quantity of signal transmitting attempts at the coverage enhancement level currently used by the terminal, and powerRampingStep_CI is a power ramping step in each signal transmitting attempt at the coverage enhancement level currently used by the terminal.

Based on any of the foregoing embodiments, the determining, by the terminal, the target received power includes:

determining, by the terminal, that a value of DELTA_PREAMBLE is 0.

Based on any of the foregoing embodiments, the determining, by the terminal, the quantity of signal transmitting attempts at the coverage enhancement level currently used by the terminal includes:

when the configuration information carries a maximum quantity of signal transmitting attempts corresponding to each coverage enhancement level, determining, by the terminal from the configuration information, a maximum quantity of signal transmitting attempts at the coverage enhancement level currently used by the terminal; or when the configuration information carries a total of maximum quantities of signal transmitting attempts corresponding to all the coverage enhancement levels, determining, by the terminal, a maximum quantity of signal transmitting attempts at each coverage enhancement level of the terminal according to the total of quantities of attempts carried in the configuration information, and determining, according to the coverage enhancement level currently used by the terminal, a maximum quantity of signal transmitting attempts at the coverage enhancement level currently used by the terminal.

It should be noted that PREAMBLE_TRANSMISSION_COUNTER_CI (that is, the quantity of signal transmitting attempts at the coverage enhancement level currently used by the terminal) in Formula 2 and Formula 3 is not greater than the determined maximum quantity of signal transmitting attempts at the coverage enhancement level currently used by the terminal. That is, the value of PREAMBLE_TRANSMISSION_COUNTER_CI may start from 1, and increase to the maximum quantity of signal transmitting attempts at the coverage enhancement level currently used by the terminal.

In addition, the present invention does not limit the use of the maximum quantity of attempts of the terminal.

Based on any of the foregoing embodiments, the determining, by the terminal, the power ramping step in each signal transmitting attempt at the coverage enhancement level currently used by the terminal includes:

when the configuration information carries a power ramping step in each signal transmitting attempt corresponding to each coverage enhancement level, determining, by the terminal from the configuration information, the power ramping step in each signal transmitting attempt at the coverage enhancement level currently used by the terminal; or when the configuration information carries a total of power ramping steps after the signal is transmitted repeatedly for N times in each attempt corresponding to each coverage enhancement level, determining, by the terminal according to the total of power ramping steps carried in the configuration information, from the configuration information, a total of power ramping steps after the signal is transmitted repeatedly for N times in each attempt corresponding to the coverage enhancement level currently used by the terminal; and according to the determined total of power ramping steps, determining the power ramping step in each signal transmitting attempt at the coverage enhancement level currently used by the terminal.

Based on any of the foregoing embodiments, after the terminal switches the currently used coverage enhancement level, the method further includes:

determining, by the terminal according to the power compensation value corresponding to the coverage enhancement level used before the switching and a power compensation value corresponding to a coverage enhancement level used after the switching, a transmit power used for transmitting the signal at the coverage enhancement level used after the switching, where the coverage enhancement level used by the terminal after the switching is higher than the coverage enhancement level used by the terminal before the switching.

Further, the terminal switches the used coverage enhancement level according to the following step:

when the currently determined transmit power is the maximum transmit power of the terminal, if the terminal determines that the network side receives no signal transmitted by the terminal, switching, by the terminal, the coverage enhancement level used by the terminal.

In implementation, in an optional implementation manner, the terminal determines, according to the following formula, the transmit power used for transmitting the signal at the coverage enhancement level used after the switching:

$$\begin{cases} P_i \geq P_{i-1} + G_{Ri-1} - G_{Ri}, & (P_{i-1} + G_{Ri-1} - G_{Ri}) < P_{MAX} \\ P_i = P_{MAX}, & (P_{i-1} + G_{Ri-1} - G_{Ri}) \geq P_{MAX} \end{cases}$$ Formula 4 where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, and $G_{Ri-1}$ is the power compensation value corresponding to the coverage enhancement level of the terminal before the switching.

In another optional implementation manner, the terminal determines, according to the following formula, the transmit power used for transmitting the signal at the coverage enhancement level used after the switching:

$$\begin{cases} P_i \geq P_{i-1} + G_{Ri-1} - G_{Ri} + \text{powerRampingStep\_CI\_i}, & (P_{i-1} + G_{Ri-1} - G_{Ri} + \text{powerRampingStep\_CI\_i}) < P_{MAX} \\ P_i = P_{MAX}, & (P_{i-1} + G_{Ri-1} - G_{Ri} + \text{powerRampingStep\_CI\_i}) \geq P_{MAX} \end{cases}$$ Formula 5 where $P_i$ is the transmit power used by the terminal for transmitting the signal at the coverage enhancement level used after the switching, $P_{i-1}$ is a transmit power used by the terminal in a last signal transmitting attempt at the coverage enhancement level used before the switching, $P_{MAX}$ is the maximum transmit power of the terminal, $G_{Ri}$ is the power compensation value corresponding to the coverage enhancement level of the terminal after the switching, $G_{Ri-1}$ is the power compensation value corresponding to the coverage enhancement level of the terminal before the switching, and powerRampingStep_CI_i is a power ramping step of the terminal in each signal transmitting attempt at the coverage enhancement level used after the switching.

A method for determining powerRampingStep_CI_i in Formula 5 described above is the same as the method for determining the power ramping step in each attempt made by the terminal to transmit the signal in Formula 2 and Formula 3, and details are not described herein.

Further, preferably, the terminal determines, according to the following formula, the transmit power used for transmitting the signal at the coverage enhancement level used after the switching, until a currently determined transmit power reaches the maximum transmit power of the terminal:

$P'=P_i+(\text{PREAMBLE\_TRANSMISSION\_COUNTER\_CI\_i}-1)*\text{powerRampingStep\_CI\_i}$ Formula 6, where P' is the current transmit power determined by the terminal for transmitting the signal, and PREAMBLE_TRANSMISSION_COUNTER_CI_i is a maximum quantity of signal transmitting attempts made by the terminal at the coverage enhancement level used after the switching.

A method for determining PREAMBLE_TRANSMISSION_COUNTER_CI_i in Formula 6 described above is the same as the method for determining the quantity of attempts made by the terminal to transmit the signal in Formula 2 and Formula 3, and details are not described herein.

In implementation, the value of PREAMBLE_TRANSMISSION_COUNTER_CI_i falls within $[1, \ldots, N_i]$, and $N_i$ is the maximum quantity of signal transmitting attempts made by the terminal at the coverage enhancement level used after the switching; or the value of PREAMBLE_TRANSMISSION_COUNTER_CI_i falls within $[N'+1, \ldots, N'+N_i]$, N' is a total of maximum quantities of signal transmitting attempts made by the terminal before switching the coverage enhancement level, and $N_i$ is the maximum quantity of signal transmitting attempts made by the terminal at the coverage enhancement level used after the switching.

Based on any of the foregoing embodiments, the determining, by the terminal according to the configuration information, a transmit power used for transmitting the signal at a coverage enhancement level currently used by the terminal includes:

when the power compensation value cannot be obtained according to the configuration information, determining, by the terminal, that the transmit power used by the terminal for transmitting the signal is the maximum transmit power of the terminal.

Figure 7:
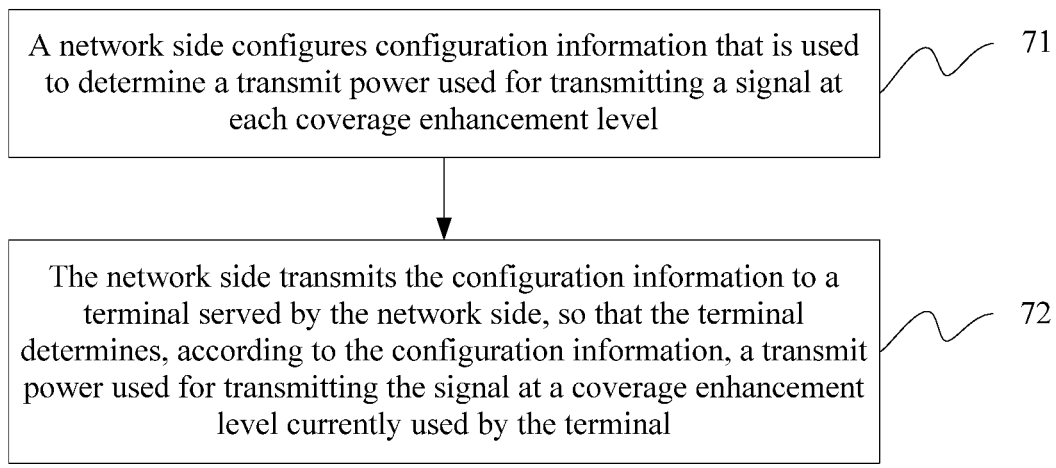
FIG. 7 is a schematic diagram of a method for determining a transmit power in another coverage enhancement scenario according to the present invention.

Based on the same invention conception, an embodiment of the present invention further provides another method for determining a transmit power in a coverage enhancement scenario. Referring to FIG. 7, the method includes:

Step 71: A network side configures configuration information that is used to determine a transmit power used for transmitting a signal at each coverage enhancement level.

Step 72: The network side transmits the configuration information to a terminal served by the network side, so that the terminal determines, according to the configuration information, a transmit power used for transmitting the signal at a coverage enhancement level currently used by the terminal.

In this embodiment of the present invention, the configuration information includes at least one of the following information:

a power compensation value corresponding to each coverage enhancement level;

a quantity of repetition times required for the signal to be transmitted at each coverage enhancement level;

a maximum quantity of signal transmitting attempts at each coverage enhancement level;

a total of maximum quantities of signal transmitting attempts at all the coverage enhancement levels;

a power ramping step in each signal transmitting attempt corresponding to each coverage enhancement level; or a total of power ramping steps after the signal is transmitted repeatedly for N times in any attempt corresponding to each coverage enhancement level.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An apparatus, comprising:
   a memory to store program code;
   a processor in communication with the memory; and
   wherein the program code, when executed by the processor, causes the apparatus to:
   obtain configuration information for determining a transmit power used for transmitting a signal at each coverage enhancement level,
   determine, according to the configuration information, a transmit power used for transmitting the signal at a coverage enhancement level currently used by the apparatus,
   when the configuration information comprises a maximum quantity of signal transmitting attempts corresponding to each coverage enhancement level, determine, from the configuration information, a maximum quantity of signal transmitting attempts at the coverage enhancement level currently used by the apparatus, and
   transmit the signal using the determined transmit power.

2. The apparatus according to claim 1, wherein the configuration information comprises at least one of the following information:
   a power compensation value corresponding to each coverage enhancement level;
   a quantity of repetition times required for the signal to be transmitted at each coverage enhancement level;
   a total of maximum quantities of signal transmitting attempts at all the coverage enhancement levels;
   a power ramping step in each signal transmitting attempt corresponding to each coverage enhancement level; or
   a total of power ramping steps after the signal is transmitted repeatedly for N times in each attempt corresponding to each coverage enhancement level.

3. The apparatus according to claim 2, wherein to determine, according to the configuration information, the transmit power used for transmitting the signal at a coverage enhancement level currently used by the apparatus, the program code, when executed by the processor, causes the apparatus to:
   determine, according to a correspondence between a quantity of repetition times and a power compensation value, a power compensation value corresponding to the quantity of repetition times required for the signal to be transmitted at the coverage enhancement level currently used by the apparatus; and
   determine, according to the determined power compensation value, the transmit power used for transmitting the signal at the coverage enhancement level currently used by the apparatus.

4. The apparatus according to claim 3, wherein the transmit power used for transmitting the signal at the coverage enhancement level currently used by the apparatus meets the following formula:

$$P=\min\{P_{MAX}, \text{PREAMBLE\_RECEIVED\_TARGET\_POWER\_}CI+PL\},$$

wherein P is the transmit power of transmitting the signal by the apparatus, $P_{MAX}$ is a maximum transmit power of the apparatus, PREAMBLE_RECEIVED_TARGET_POWER_CI is a target received power determined according to the power compensation value corresponding to the coverage enhancement level currently used by the apparatus, and PL is a path loss.

5. The apparatus according to claim 4, wherein the target received power meets the following formula:

$$\text{PREAMBLE\_RECEIVED\_TARGET\_POWER\_}CI= \\ \text{preambleInitialReceivedTargetPower+DELTA\_PREAMBLE\_}G_{Ri}+(\text{PREAMBLE\_TRANSMISSION\_COUNTER\_}CI-1)*\text{powerRampingStep\_}CI,$$

wherein $G_{Ri}$ is the power compensation value, preambleInitialReceivedTargetPower is an initial target received power, DELTA_PREAMBLE is an offset corresponding to a format of the signal, PREAMBLE_TRANSMISSION_COUNTER_CI is a quantity of signal transmitting attempts at the coverage enhancement level currently used by the apparatus, and powerRampingStep_CI is a power ramping step in each signal transmitting attempt at the coverage enhancement level currently used by the apparatus.

6. The apparatus according to claim 5, wherein DELTA_PREAMBLE is 0.

7. The apparatus according to claim 1, wherein the signal comprises at least one of data or a random access preamble sequence.

8. The apparatus according to claim 7, wherein, the signal comprises a random access preamble sequence, and when a random access process is not successful after power ramping is performed according to a maximum quantity of attempts corresponding to the coverage enhancement level currently used by the apparatus, the program code, when executed by the processor, causes the apparatus to switch to a higher coverage enhancement level to continue attempting.

9. An apparatus, comprising:
a memory to store program code;
a processor in communication with the memory; and
wherein the program code, when executed by the processor, causes the apparatus to:
obtain configuration information for determining a transmit power used for transmitting a signal at each coverage enhancement level, wherein the configuration information comprises a quantity of repetition times required for the signal to be transmitted at a coverage enhancement level currently used by the apparatus,
determine, according to the quantity of repetition times, a transmit power used for transmitting the signal at the coverage enhancement level currently used by the apparatus, and
transmit the signal using the determined transmit power.

10. The apparatus according to claim 9, wherein the program code, when executed by the processor, further causes the apparatus to:
determine, according to a correspondence between the quantity of repetition times and a power compensation value, a power compensation value corresponding to the quantity of repetition times required for the signal to be transmitted at the coverage enhancement level currently used by the apparatus; and
determine, according to the determined power compensation value, the transmit power used for transmitting the signal at the coverage enhancement level currently used by the apparatus.

11. The apparatus according to claim 10, wherein the transmit power used for transmitting the signal at the coverage enhancement level currently used by the apparatus meets the following formula:

$$P=\min\{P_{MAX}, \text{PREAMBLE\_RECEIVED\_TARGET\_POWER\_CI}+PL\},$$

wherein P is the transmit power of transmitting the signal by the apparatus, $P_{MAX}$ is a maximum transmit power of the apparatus, PREAMBLE_RECEIVED_TARGET_POWER_CI is a target received power determined according to the power compensation value corresponding to the coverage enhancement level currently used by the apparatus, and PL is a path loss.

12. The apparatus according to claim 11, wherein the target received power meets the following formula:

$$\text{PREAMBLE\_RECEIVED\_TARGET\_POWER\_CI}= \\ \text{preambleInitialReceivedTargetPower}+\text{DELTA\_PREAMBLE}\_G_{Ri}+(\text{PREAMBLE\_TRANSMISSION\_COUNTER\_CI}-1)*\text{powerRampingStep\_CI},$$

wherein $G_{Ri}$ is the power compensation value preambleInitialReceivedTargetPower is an, initial target received power, DELTA_PREAMBLE is an offset corresponding to a format of the signal, PREAMBLE_TRANSMISSION_COUNTER_CI is a quantity of signal transmitting attempts at the coverage enhancement level currently used by the apparatus, and powerRampingStep_CI is a power ramping step in each signal transmitting attempt at the coverage enhancement level currently used by the apparatus.

13. The apparatus according to claim 12, wherein DELTA_PREAMBLE is 0.

14. The apparatus according to claim 9, wherein the configuration information comprises at least one of the following information:
a power compensation value corresponding to each coverage enhancement level;
a quantity of repetition times required for the signal to be transmitted at each coverage enhancement level;
a maximum quantity of signal transmitting attempts corresponding to each coverage enhancement level;
a total of maximum quantities of signal transmitting attempts at all the coverage enhancement levels;
a power ramping step in each signal transmitting attempt corresponding to each coverage enhancement level; or
a total of power ramping steps after the signal is transmitted repeatedly for N times in each attempt corresponding to each coverage enhancement level.

15. The apparatus according to claim 9, wherein the signal comprises at least one of data or a random access preamble sequence.

16. The apparatus according to claim 15, wherein the signal comprises a random access preamble sequence, and when a random access process is not successful after power ramping is performed according to a maximum quantity of attempts corresponding to the coverage enhancement level currently used by the apparatus, the program code, when executed by the processor, causes the apparatus to switch to a higher coverage enhancement level to continue attempting.

17. A method, comprising:
obtaining, by an apparatus, configuration information, wherein the configuration information comprises a quantity of repetition times required for a signal to be transmitted at a coverage enhancement level currently used by the apparatus;
determining, by the apparatus according to the quantity of repetition times required for the signal to be transmitted at a coverage enhancement level currently used by the apparatus, a transmit power used for transmitting the signal at the coverage enhancement level currently used by the apparatus; and
transmitting, by the apparatus, the signal using the determined transmit power.

18. The method according to claim 17, wherein determining, by the apparatus according to the quantity of repetition times required for the signal to be transmitted at a coverage enhancement level currently used by the apparatus, a transmit power used for transmitting the signal at the coverage enhancement level currently used by the apparatus comprises:

determining, by the apparatus according to a correspondence between the quantity of repetition times and a power compensation value, a power compensation value corresponding to the quantity of repetition times required for the signal to be transmitted at the coverage enhancement level currently used by the apparatus; and determining, by the apparatus according to the determined power compensation value, the transmit power used for transmitting the signal at the coverage enhancement level currently used by the apparatus.

19. The method according to claim 18, wherein the transmit power used for transmitting the signal at the coverage enhancement level currently used by the apparatus meets the following formula:

$$P=\min\{P_{MAX}, \text{PREAMBLE\_RECEIVED\_TARGET\_POWER\_}CI+PL\}$$

wherein P is the transmit power of transmitting the signal by the apparatus, $P_{MAX}$ is a maximum transmit power of the apparatus, PREAMBLE_RECEIVED_TARGET_POWER_CI is a target received power determined according to the power compensation value corresponding to the coverage enhancement level currently used by the apparatus, and PL is a path loss.

20. The method according to claim 19, wherein the target received power meets the following formula:

PREAMBLE_RECEIVED_TARGET_POWER_*CI*=
preambleInitialReceivedTargetPower+DELTA_PREAMBLE_$G_{Ri}$+(PREAMBLE_TRANSMISSION_COUNTER_*CI*−1)*powerRampingStep_*CI*, wherein $G_{Ri}$ is the power compensation value, preambleInitialReceivedTargetPower is an initial target received power, DELTA_PREAMBLE is an offset corresponding to a format of the signal, PREAMBLE_TRANSMISSION_COUNTER_CI is a quantity of signal transmitting attempts at the coverage enhancement level currently used by the apparatus, and powerRampingStep_CI is a power ramping step in each signal transmitting attempt at the coverage enhancement level currently used by the apparatus.

21. The method according to claim 20, wherein DELTA_PREAMBLE is 0.

22. The method according to claim 17, wherein the configuration information comprises at least one of the following information:
- a power compensation value corresponding to each coverage enhancement level;
- a quantity of repetition times required for the signal to be transmitted at each coverage enhancement level;
- a maximum quantity of signal transmitting attempts corresponding each coverage enhancement level;
- a total of maximum quantities of signal transmitting attempts at all the coverage enhancement levels;
- a power ramping step in each signal transmitting attempt corresponding to each coverage enhancement level; or
- a total of power ramping steps after the signal is transmitted repeatedly for N times in each attempt corresponding to each coverage enhancement level.

23. The method according to claim 17, wherein the signal comprises at least one of data or a random access preamble sequence.

24. The method according to claim 23, wherein the signal comprises a random access preamble sequence, and when a random access process is not successful after power ramping is performed according to a maximum quantity of attempts corresponding to the coverage enhancement level currently used by the apparatus, switching to a higher coverage enhancement level to continue attempting.

* * * * *

UNITED STATES PATENT AND TRADEMARK OFFICE
CERTIFICATE OF CORRECTION

PATENT NO. : 10,560,907 B2  
APPLICATION NO. : 15/803587  
DATED : February 11, 2020  
INVENTOR(S) : Xiangdong Zhang and Jinhuan Xia Page 1 of 1

It is certified that error appears in the above-identified patent and that said Letters Patent is hereby corrected as shown below:

On the Title Page

References Cited, U.S. Patent Documents: "Pajkoski et al." should read "Pajukoski et al."

In the Claims

Claim 12, Column 40, Line 9: "is an, initial" should read "is an initial"

Signed and Sealed this  
Fifth Day of May, 2020

Andrei Iancu  
*Director of the United States Patent and Trademark Office*